US011233909B2

(12) United States Patent
Ikeda et al.

(10) Patent No.: US 11,233,909 B2
(45) Date of Patent: Jan. 25, 2022

(54) DISPLAY APPARATUS CAPABLE OF DISPLAYING GUIDANCE INFORMATION AND NON-TRANSITORY COMPUTER READABLE MEDIUM STORING PROGRAM

(71) Applicant: FUJIFILM Business Innovation Corp., Tokyo (JP)

(72) Inventors: Eriko Ikeda, Kanagawa (JP); Xiaojing Zhang, Kanagawa (JP); Hiroo Seki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 311 days.

(21) Appl. No.: 16/182,621

(22) Filed: Nov. 7, 2018

(65) Prior Publication Data

US 2019/0149671 A1    May 16, 2019

(30) Foreign Application Priority Data

Nov. 15, 2017  (JP) .............................. JP2017-219916

(51) Int. Cl.
*H04N 1/00*    (2006.01)
(52) U.S. Cl.
CPC ..... *H04N 1/00161* (2013.01); *H04N 1/00172* (2013.01); *H04N 1/00188* (2013.01)
(58) Field of Classification Search
None
See application file for complete search history.

(56) References Cited

U.S. PATENT DOCUMENTS

| 7,980,478 | B2 | 7/2011 | Watase et al. |
| 10,068,507 | B2* | 9/2018 | Shimizu ................. G02B 30/56 |
| 10,417,801 | B2* | 9/2019 | Tan ....................... H04N 9/3179 |
| 2006/0126128 | A1* | 6/2006 | Ahmed .............. H04N 1/00411 358/474 |
| 2009/0086173 | A1* | 4/2009 | Combs ................. G03B 21/134 353/122 |
| 2009/0316954 | A1* | 12/2009 | Kohara .............. G03G 15/5016 382/103 |
| 2011/0228285 | A1* | 9/2011 | Kohara .............. H04N 1/00493 358/1.2 |
| 2011/0228347 | A1* | 9/2011 | Kohara .............. H04N 1/00347 358/446 |
| 2015/0060545 | A1* | 3/2015 | Nishimachi ............ G06Q 20/18 235/439 |

(Continued)

FOREIGN PATENT DOCUMENTS

| JP | 2004133009 | 4/2004 |
| JP | 2007164367 | 6/2007 |

(Continued)

OTHER PUBLICATIONS

"Office Action of Japan Counterpart Application", dated Jun. 15, 2021, with English translation thereof, pp. 1-6.

*Primary Examiner* — Henok Shiferaw
(74) *Attorney, Agent, or Firm* — JCIPRNET

(57) ABSTRACT

A display apparatus includes: a reading unit that reads information; and a display unit that, in response to an operation of moving a medium closer to a display surface or placing the medium on the display surface, displays on the display surface guidance information that guides a position, at which information associated with the medium is readable by the reading unit, on the display surface.

15 Claims, 20 Drawing Sheets

(56) References Cited

U.S. PATENT DOCUMENTS

| | | | |
|---|---|---|---|
| 2017/0244850 A1* | 8/2017 | Ishitori | H04N 1/0044 |
| 2017/0270712 A1* | 9/2017 | Tyson | H04N 1/00161 |
| 2018/0239933 A1 | 8/2018 | Nishimachi | |
| 2019/0240577 A1* | 8/2019 | Oshima | A63F 13/211 |

FOREIGN PATENT DOCUMENTS

| | | |
|---|---|---|
| JP | 2009194536 | 8/2009 |
| JP | 2015072676 | 4/2015 |
| JP | 2017046127 | 3/2017 |

* cited by examiner

DISPLAY APPARATUS CAPABLE OF DISPLAYING GUIDANCE INFORMATION AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-219916 filed on Nov. 15, 2017.

BACKGROUND

Technical Field

The present invention relates to a display apparatus and a non-transitory computer readable medium storing a program.

SUMMARY

According to an aspect of the invention, there is provided a display apparatus including: a reading unit that reads information; and a display unit that, in response to an operation of moving a medium closer to a display surface or placing the medium on the display surface, displays on the display surface guidance information that guides a position, at which information associated with the medium is readable by the reading unit, on the display surface.

BRIEF DESCRIPTION OF THE DRAWINGS

Exemplary embodiment of the present invention will be described in detail based on the following figures, wherein.

DETAILED DESCRIPTION

Hereinafter, an exemplary embodiment of the invention will be described in detail with reference to the accompanying drawings.

[Entire Configuration of Image Processing Apparatus]

Figure 1:
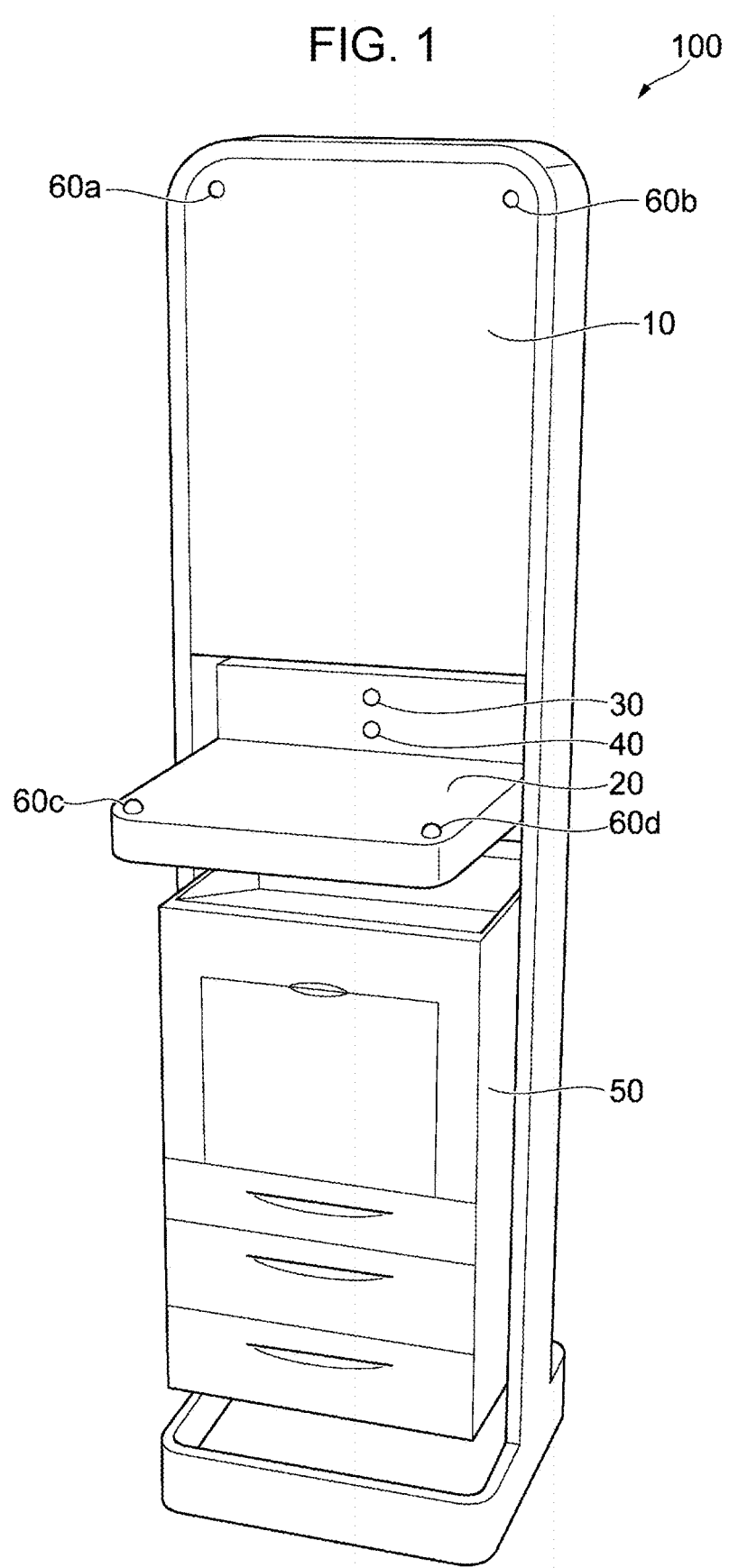
FIG. 1 is a perspective view of an image processing apparatus according to an exemplary embodiment of the invention.

FIG. 1 is a perspective view of an image processing apparatus 100 according to an exemplary embodiment of the invention. As illustrated, the image processing apparatus 100 includes a guide display 10, an operation stand 20, a projector 30, an operation detector 40, a printer 50, and imagers 60a to 60d.

The guide display 10 is a display that displays a message to a user, such as guidance, for an operation of the image processing apparatus 100. Unlike the later-described operation stand 20, even when contact is made with the surface of the guide display 10, contact is not detected. Here, for instance, a liquid crystal display may be used as the guide display 10. In the exemplary embodiment, the guide display 10 is provided as an example of a first display surface that does not detect a contact operation.

The operation stand 20 is a substantially horizontal stand that projects toward a user so that the user can place and operate a mobile information terminal and a document. In this case, the "substantially horizontal" may refer to a horizontal levelness that does not cause a mobile information terminal or a document placed on the operation stand 20 to slip down. The operation stand 20 is designed so that an image is displayed by the function of the later-described projector 30, and contact with the surface of the operation stand 20 is detected by the function of the later-described operation detector 40. However, the operation stand 20 itself may be configured by a display and a projector 30 may not be provided. In the exemplary embodiment, the operation stand 20 is provided as an example of a display surface, a second display surface, and a platen.

The projector 30 is a projector that projects an image onto the operation stand 20. The projector 30 projects an image onto the operation stand 20 in an oblique direction from above because the projector 30 is provided at a lower portion of the guide display 10. The projector 30, however, may be provided vertically above the operation stand 20 to project an image onto the operation stand 20 in a direction from immediately above. Alternatively, the projector 30 may be provided vertically below the operation stand 20, or the projector 30 may project an image onto the operation stand 20 in a direction from immediately below using a mirror along with the projector 30. Here, for instance, a liquid crystal projector may be used as the projector 30.

The operation detector 40 detects an operation by contacting with the surface of the operation stand 20. Detection of the operation may be made by sensing blocking of infrared rays by a finger of a user, the infrared rays radiating to the surface of the operation stand 20 radially. Specifically, for instance, an infrared LED and an infrared sensor may be used as the operation detector 40.

The printer 50 is a printer that prints an image on paper or other media. Here, for instance, an electrophotographic system that forms an image by transferring toner adhering to a photoconductor onto a recording medium, or an inkjet printer that discharges ink on a recording medium to form an image may be used as the printer 50. Alternatively, the printer 50 may be a printer that creates a printed material by pressing a block, to which ink is applied, against paper or other media. In the exemplary embodiment, the printer 50 is provided as an example of the printer.

The imagers 60a to 60d are cameras that capture an image of a document or a mobile information terminal placed on the operation stand 20. Among these, the imagers 60a, 60b are provided at an upper portion of the guide display 10, and thus mainly capture an image of a document or a mobile information terminal placed on the operation stand 20 from above. Also, the imagers 60c, 60d are provided on the near side of the guide display 10, and thus mainly capture an image in an oblique direction from below when a three-dimensional object is placed on the operation stand 20. Like this, the imagers 60a to 60d have different applications according to the positions provided, and hereinafter are referred to as the imager 60 when these imagers are not distinguished from each other. In this case, the imager 60 is provided as a scanner, thus hereinafter "captures something" may also be expressed as "scans something". In the exemplary embodiment, the imager 60 is provided as an example of the reading device. Although four imagers 60 are illustrated in the drawings, the number of imagers 60 is not limited to four. For instance, an imager 60 for detecting a line of sight and/or motion of a user may be provided at a position which allows such detection.

[Hardware Configuration of Image Processing Apparatus]

Figure 2:
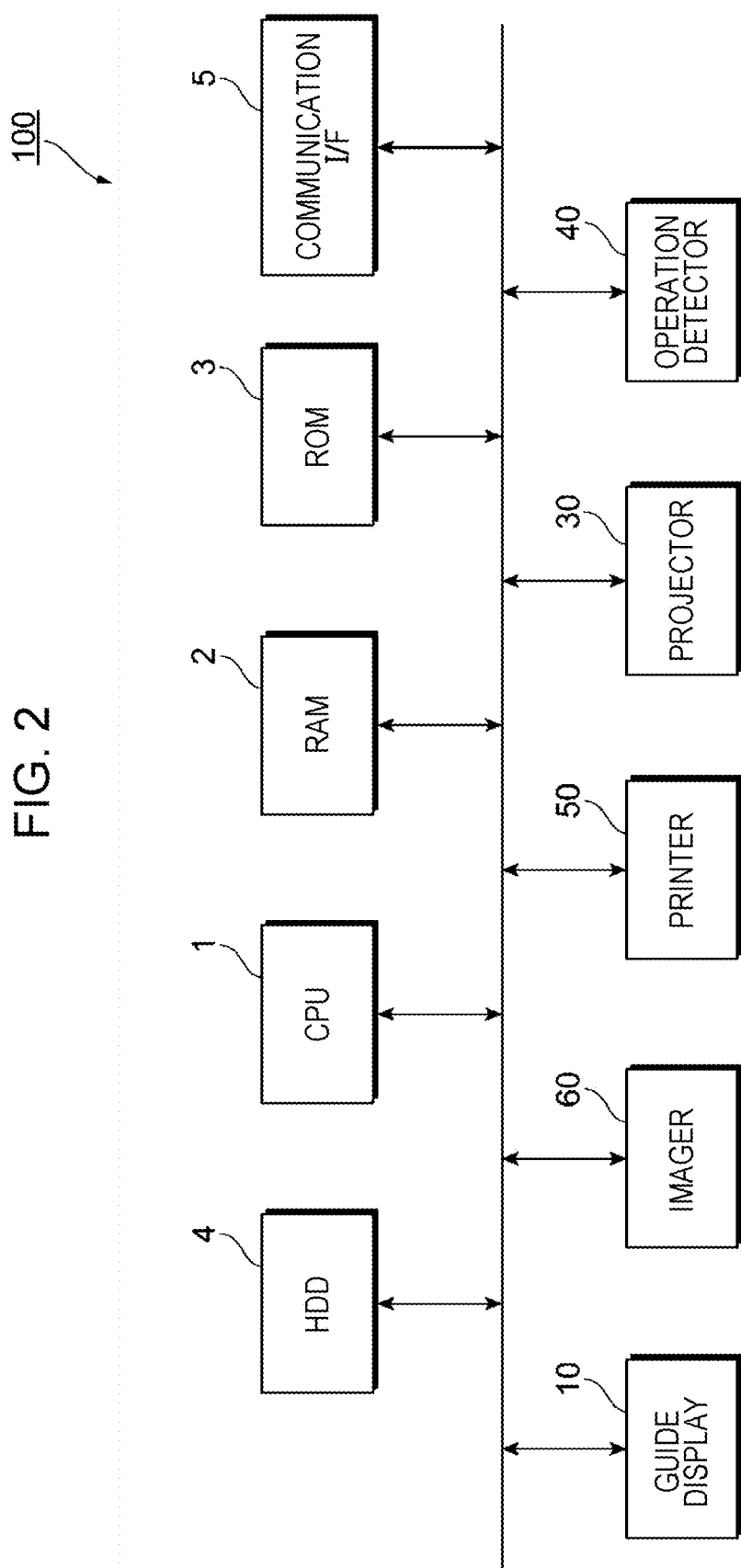
FIG. 2 is a diagram illustrating an example of a hardware configuration of the image processing apparatus according to the exemplary embodiment of the invention.

FIG. 2 is a diagram illustrating an example of a hardware configuration of the image processing apparatus 100 according to the exemplary embodiment. As illustrated, the image processing apparatus 100 includes a central processing unit (CPU) 1, a random access memory (RAM) 2, a read only memory (ROM) 3, a hard disk drive (HDD) 4, a communication interface (hereinafter referred to as a "communication I/F") 5, a guide display 10, a projector 30, an operation detector 40, a printer 50, and an imager 60.

The CPU 1 implements the later-described functions by loading various programs stored in the ROM 3 into the RAM 2, and executing the programs. The RAM 2 is a memory that is used as a memory for work of the CPU 1. The ROM 3 is a memory that stores various programs to be executed by the CPU 1. The HDD 4 is, for instance, a magnetic disk device that stores data scanned by the imager 60, data used by printing in the printer 50 and other data. The communication I/F 5 transmits and receives various information to and from other devices via a communication line.

Since the guide display 10, the projector 30, the operation detector 40, the printer 50, and the imager 60 have been already described with reference to FIG. 1, a description thereof is omitted here.

[Functional Configuration of Control Device]

Figure 3:
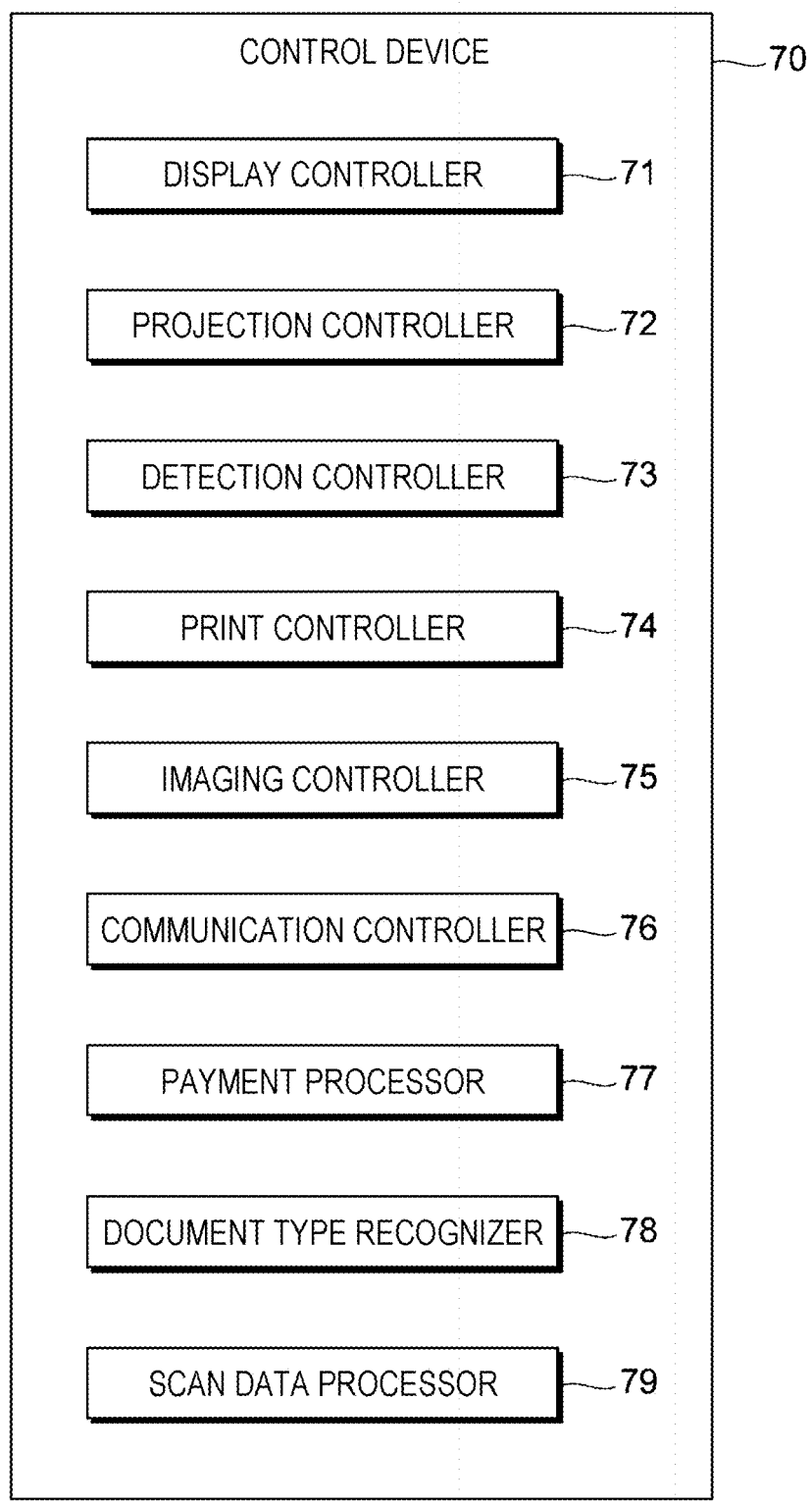
FIG. 3 is a block diagram illustrating a functional configuration example of a control device in the exemplary embodiment of the invention.

FIG. 3 is a block diagram illustrating a functional configuration example of a control device 70 that controls the image processing apparatus 100. Here, the control device 70 is an example of a display device and a an image reading device, and is regarded as a device which is implemented by the CPU 1 (see FIG. 2) of the image processing apparatus 100 in such a manner that the CPU 1 reads a program implementing the later-described functional units, for instance, from the ROM 3 (see FIG. 2) to the RAM (see FIG. 2) and executes the program. As illustrated, the control device 70 includes a display controller 71, a projection controller 72, a detection controller 73, a print controller 74, an imaging controller 75, a communication controller 76, a payment processor 77, a document type recognizer 78, and a scan data processor 79.

The display controller 71 displays various types of guidance and various screens on the guide display 10. In the exemplary embodiment, the display controller 71 is provided as an example of a first display unit that displays information on the first display surface.

The projection controller 72 displays various screens on the operation stand 20 using the projector 30. In the exemplary embodiment, the projection controller 72 is provided as an example of a second display unit that displays information on the display surface, the second display surface, and the platen.

The detection controller 73 determines whether or not the operation detector 40 has detected an operation by contacting with the surface of the operation stand 20. In addition, the detection controller 73 also determines whether or not a human sensor (not illustrated) has detected approach of a user.

The print controller 74 controls printing by the printer 50.

The imaging controller 75 controls the imager 60 to capture an image of a document or a mobile information terminal placed on the operation stand 20, and obtains the image captured by the imager 60. In particular, the imaging controller 75 controls the imager 60 such that when a predetermined time has elapsed since a document is placed on the operation stand 20, the imager 60 scans the document. In the exemplary embodiment, the imaging controller 75 is provided as an example of a reading unit that reads an image. Also, the imaging controller 75 may obtain a detection result from the imager 60 that detects a line of sight and/or motion of a user. In this case, the imaging controller 75 is an example of a detection unit that detects motion of a user.

When information recorded on a card is read by a card reader (not illustrated), the communication controller 76 receives the information from the card reader. Also, when information stored in a mobile information terminal is received by a near field communication (NFC) reader (not illustrated), the communication controller 76 receives the information from the NFC reader. In addition, the communication controller 76 receives information stored in a mobile information terminal via Wi-Fi (registered trademark). Instead of Wi-Fi, Bluetooth (registered trademark) may be used. However, a description is given below with Wi-Fi used. In the exemplary embodiment, the communication controller 76 is provided as an example of a reading unit that reads information.

In addition, the communication controller 76 receives a file from an external cloud system or transmits a file to an external cloud system via the communication I/F 5. In the exemplary embodiment, the communication controller 76 is provided as an example of a receiving unit that receives data from another device, and an example of a transmission unit that transmits data to another device.

The payment processor 77 performs payment-related processing such as generation of payment information based on the information received by the communication controller 76 from the card reader and the information received by the communication controller 76 from Wi-Fi.

When a document is placed on the operation stand 20, the document type recognizer 78 recognizes the type of the document. The type of the document may be recognized, for instance, by pattern matching with image data pre-stored for each type of document.

The scan data processor 79 performs various types of processing on scan data obtained by the imaging controller 75. Here, the various types of processing include processing of scan data, and processing to integrate pieces of scan data obtained by multiple scans. In the exemplary embodiment, the scan data processor 79 is provided as an example of an output unit that outputs an image obtained by integrating two images.

[Screen Display Example of Image Processing Apparatus]

In the exemplary embodiment, final printing and scanning are performed by the image processing apparatus 100, but a prior operation for the printing and scanning is performed by a mobile information terminal such as a smartphone.

Thus, before a screen display example of the image processing apparatus 100 is described, a prior operation performed in the mobile information terminal will be described. An application software (hereinafter referred to as an "application") for utilizing the image processing apparatus 100 is installed in the mobile information terminal, and a user performs the prior operation using the application. It is to be noted that the application used in the exemplary embodiment is only for utilizing the image processing apparatus 100, thus any "application" mentioned in the present description indicates the application for utilizing the image processing apparatus 100.

First, the operation for the first time in the mobile information terminal will be described. When subscribing a service for utilizing the image processing apparatus 100, a user starts up the application by the mobile information terminal, and registers authentication information and other various information for performing authentication in the mobile information terminal.

The various information (hereinafter referred to as "registration information") registered in the mobile information terminal includes a payment method, a print setting, and a storage destination.

In the exemplary embodiment, the image processing apparatus 100 is designed to be installed and utilized in a public space, and thus a payment method has to be registered. Specifically, the payment method indicates how payment is made for printing and scanning, and includes, for instance, payment by a credit card, and payment by an electronic money IC card.

Also, the print setting indicates a desired print style when printing is made. In addition to normal print setting such as monochrome printing or color printing, and single-sided printing or double-sided printing, the print setting also includes a special output style such as stapling, and putting a printed material in an envelope or a vinyl bag.

Also, the storage destination indicates where scan data obtained by scanning a document is stored. The storage destination includes an expense settlement cloud system, a document management cloud system, and a business card management cloud system. These storage destinations may be each registered as the location where scan data of a document is stored according to the type of the document. Registration may be made such that for instance, when the type of a document is receipt, the scan data is stored in the expense settlement cloud system, when the type of a document is A4 paper, the scan data is stored in the document management cloud system, and when the type of a document is business card, the scan data is stored in the business card cloud system.

Next, the operation for the second time and after in the mobile information terminal will be described. For instance, when printing a file stored in a cloud system, a user starts up the application by the mobile information terminal, obtains a list of files from the cloud system, and the list is displayed on the display of the mobile information terminal. In this state, a user reserves printing by designating a file which is desired to be printed. Hereinafter, a file for which printing is reserved is called a "print reservation file". Also, a user registers various information in the print reservation file. For instance, a user sets an output format, and a payment method to the print reservation file. Alternatively, a user may leave the output format and the payment method unset.

Subsequently, for actually printing the file, a user has to go to an installation location of the image processing apparatus 100 in a public space. The application of the mobile information terminal also provides relevant information for this case. For instance, when a user designates a print reservation file and presses down a search button of the mobile information terminal, the application displays a map of the surrounding area of the user on the display of the mobile information terminal, and displays the installation location of an image processing apparatus 100 that can print the print reservation file in consideration of an output format set for the designated print reservation file. Thus, it is possible for the user to go to the installation location of the image processing apparatus 100 and to print the print reservation file which is desired to be printed.

Hereinafter, a screen display example in the image processing apparatus 100 will be described.

(Screen Display Example During Stand-by)

Figure 4:
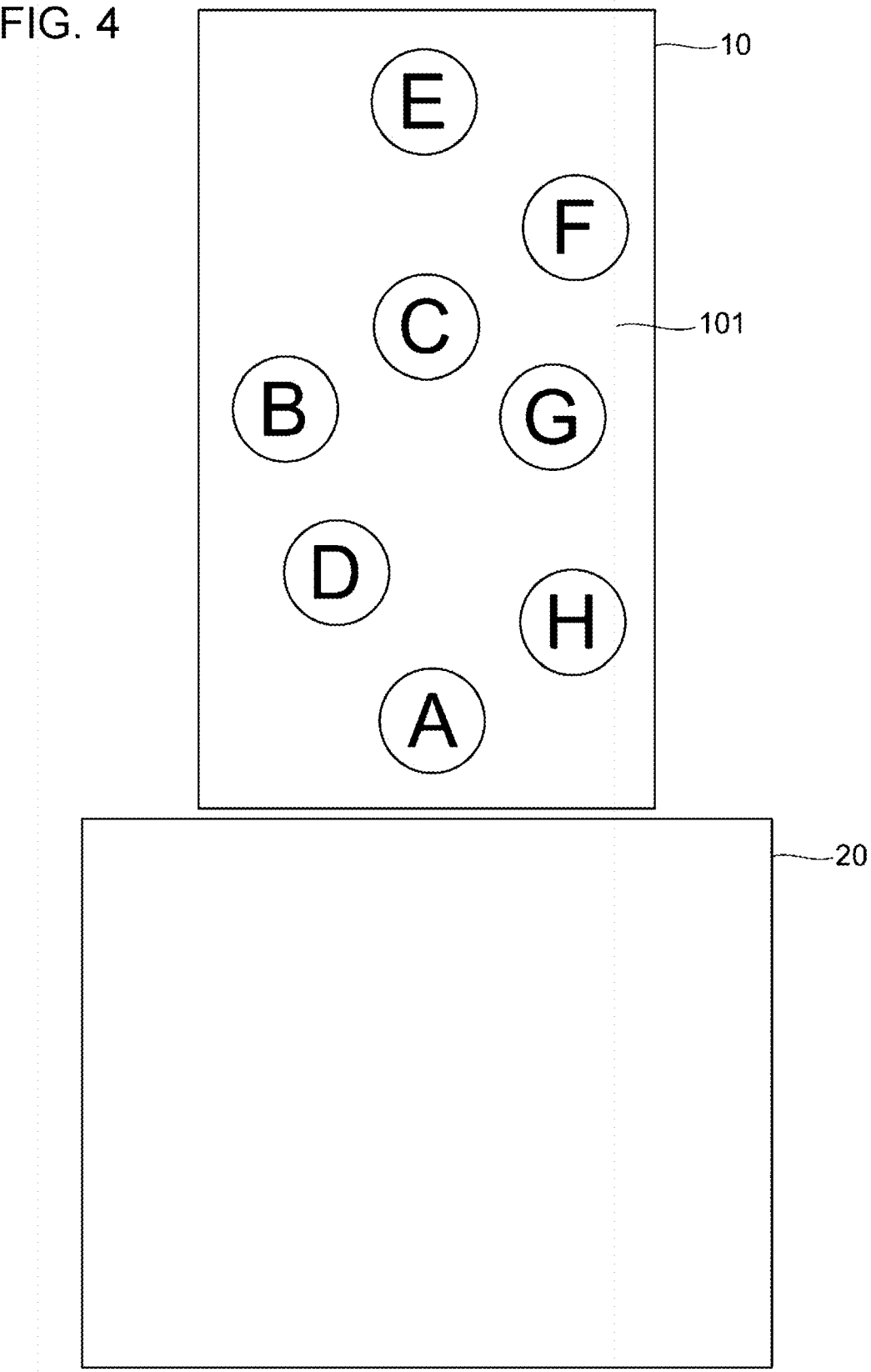
FIG. 4 is a view illustrating a screen display example during stand-by of the image processing apparatus.

FIG. 4 is a view illustrating a screen display example during stand-by of the image processing apparatus 100. As illustrated, the image processing apparatus 100 displays a stand-by screen 101 on the guide display 10 during stand-by. The stand-by screen 101 includes a graphic as an example of a display element that expresses information which is considered to be necessary for a user related to the installation location of the image processing apparatus 100. FIG. 4 illustrates information A to H as an example of such information. The stand-by screen 101 has various versions according to the installation location of the image processing apparatus 100, and the information A to H vary with the version of the stand-by screen 101. For instance, when the image processing apparatus 100 is installed in a station, the stand-by screen 101 is a station version, and the information A to H is the information on train operation, schedule, and travel. Although all graphics indicating the information A to H have the same size in FIG. 4, the size may be changed according to a priority level of information, for instance, a graphic indicating information that is considered to be highly necessary for users is displayed in large size.

In the state where the stand-by screen 101 of FIG. 4 is displayed, when one of a mobile information terminal 90, a document 95, and a three-dimensional object 97 is placed on the operation stand 20 by a user, the image processing apparatus 100 proceeds to one of print processing, two-dimensional scan processing, and three-dimensional scan processing according to the object placed on the operation stand 20. Specifically, when the mobile information terminal 90 is placed on the operation stand 20 by a user, successful authentication based on authentication information transmitted by the application which has been started up in the mobile information terminal 90 causes the image processing apparatus 100 to proceed to the print processing. In contrast, when the document 95 is placed on the operation stand 20 by a user, the image processing apparatus 100 proceeds to the two-dimensional scan processing, and when the three-dimensional object 97 is placed on the operation stand 20 by a user, the image processing apparatus 100 proceeds to the three-dimensional scan processing.

(Screen Display Example at Time of Print Processing)

Figure 5:
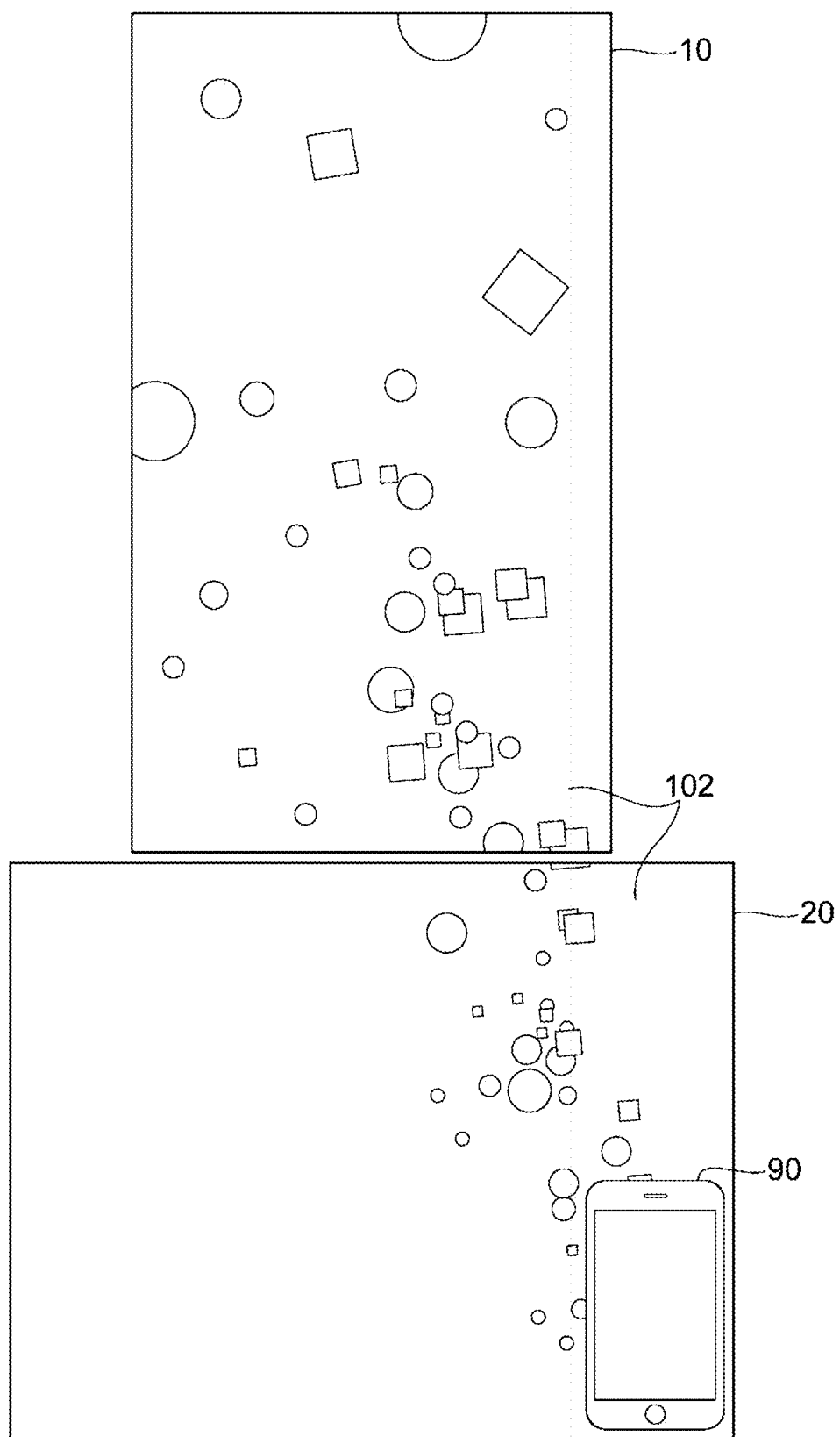
FIG. 5 is a view illustrating a screen display example when login is completed in the image processing apparatus.

FIG. 5 is a view illustrating a screen display example when login is completed in the image processing apparatus 100. When the mobile information terminal 90 is placed on the operation stand 20 by a user and authentication is successful, the image processing apparatus 100 starts print processing. In this process, successful authentication causes login processing to be completed, thus the image processing apparatus 100 first displays a login completion screen 102 on the guide display 10 and the operation stand 20. As illustrated, the login completion screen 102 is a screen in which the mobile information terminal 90, the operation stand 20, and the guide display 10 are linked by animation.

Figure 6:
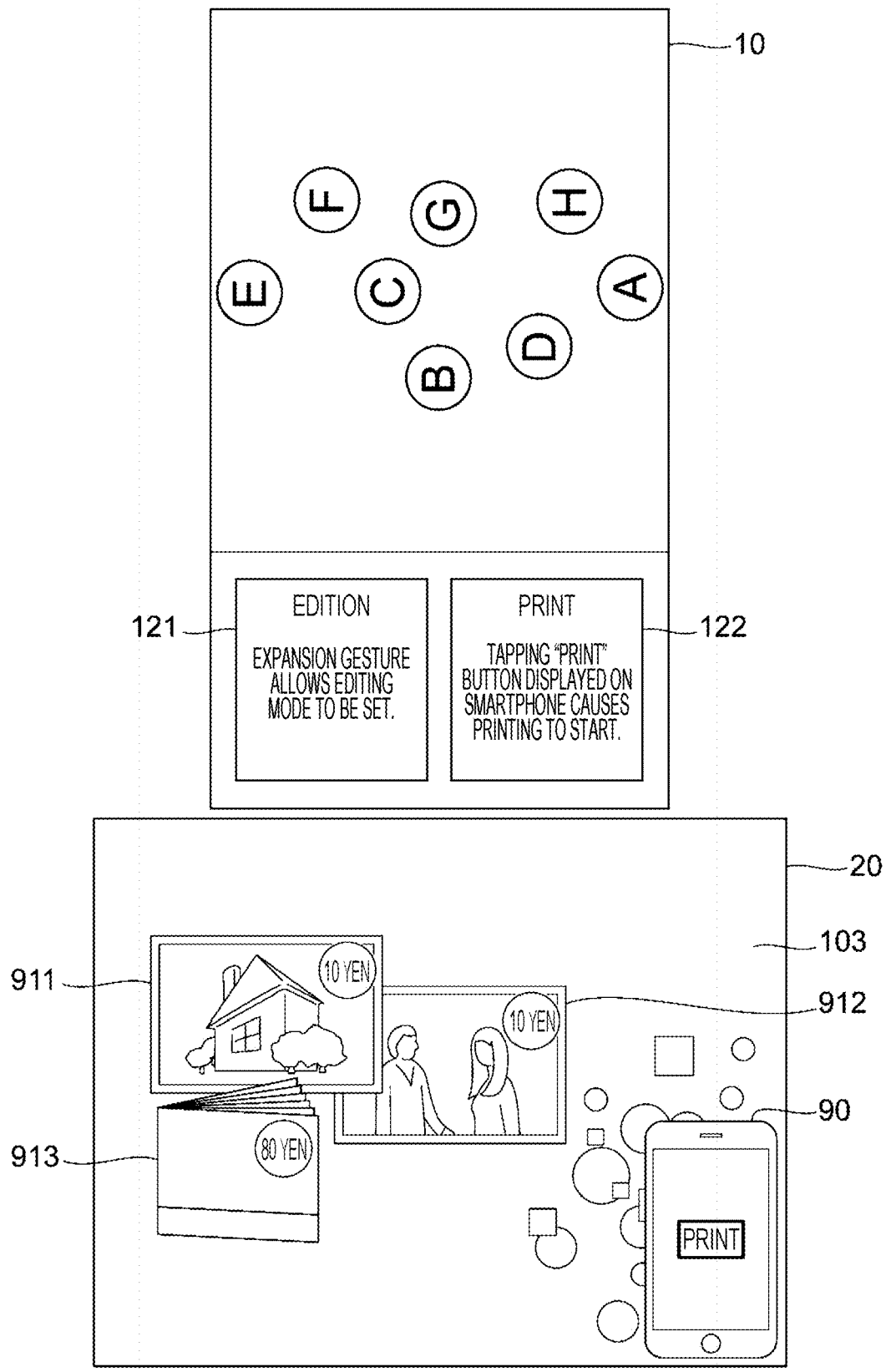
FIG. 6 is a view illustrating a screen display example when a print operation is started in the image processing apparatus.

FIG. 6 is a view illustrating a screen display example when a print operation is started in the image processing apparatus 100. When a print reservation file is designated by the mobile information terminal 90 placed on the operation stand 20, the image processing apparatus 100 displays a print instruction screen 103 on the operation stand 20. The print instruction screen 103 includes an image (hereinafter referred to as a "file image") indicating the print reservation file. FIG. 6 illustrates file images 911 to 913 as an example of such a file image. Furthermore, in FIG. 6, a printing fee is calculated according to the attribute of the print reservation file, and the printing fee is also displayed on the print instruction screen 103. On the other hand, the image processing apparatus 100 displays a guide 121 regarding edition and a guide 122 regarding print on the guide display 10. At this point, as illustrated, the application displays a print button on the display of the mobile information terminal 90.

Figure 7:
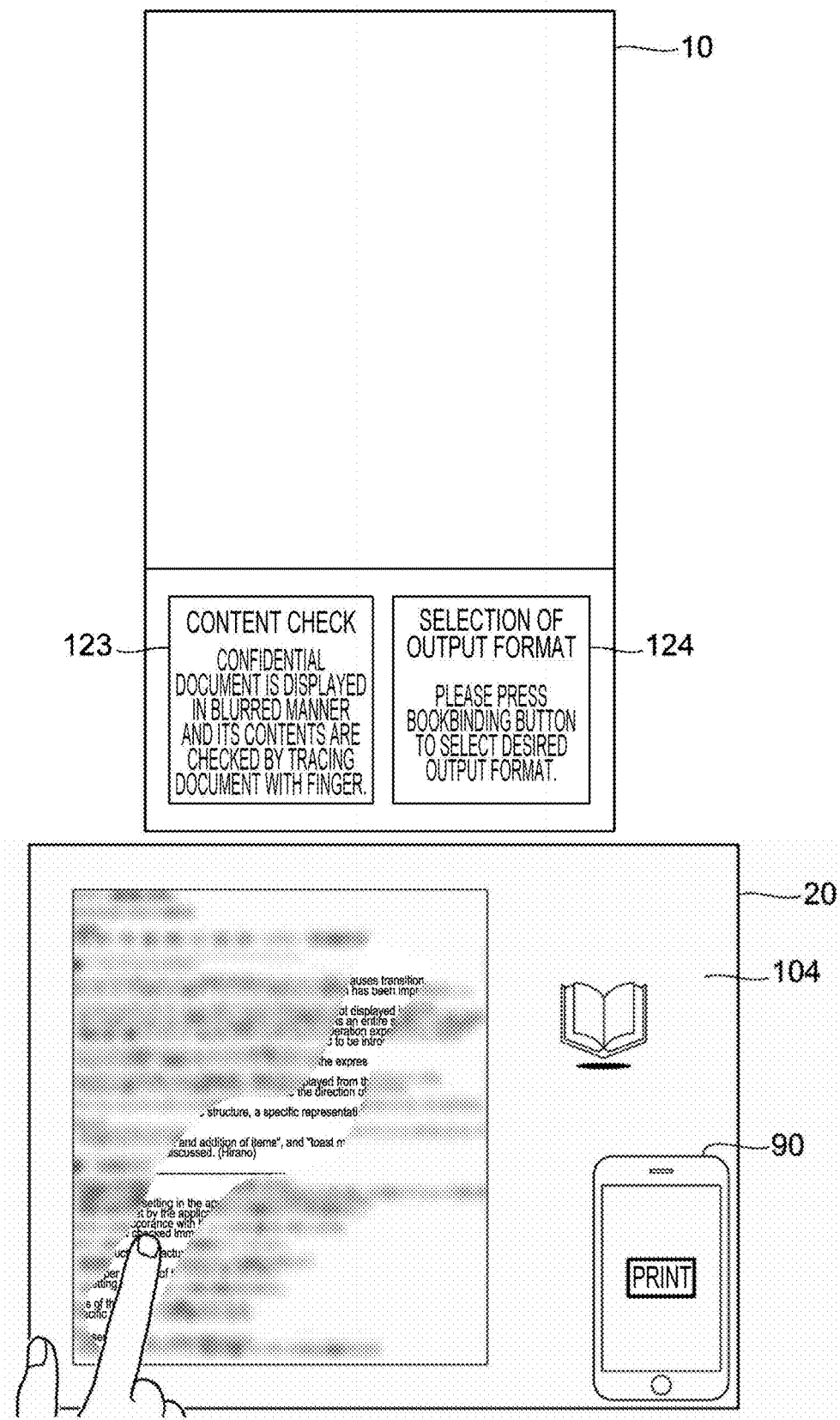
FIG. 7 is a view illustrating a screen display example when file contents are checked in the image processing apparatus.

FIG. 7 is a view illustrating a screen display example when file contents are checked in the image processing apparatus 100. When an expansion gesture is made by a user in accordance with the guide 121 of FIG. 6, the image processing apparatus 100 displays a file content display screen 104 on the operation stand 20. The file content display screen 104 is a screen that displays a document in actual size and allows editing of the document. For instance, when an expansion gesture is made on the file image 913, the contents of the print reservation file represented by the file image 913 are displayed. On the other hand, the image processing apparatus 100 displays a guide 123 regarding content check and a guide 124 regarding an output format. The characters of a confidential document such as an in-house document are first displayed in a blurred manner, and the characters traced by a finger of a user in accordance with the guide 123 may be displayed in a recognizable manner. Alternatively, the characters traced by the palm of a user may be displayed in a more recognizable manner.

Figure 8:
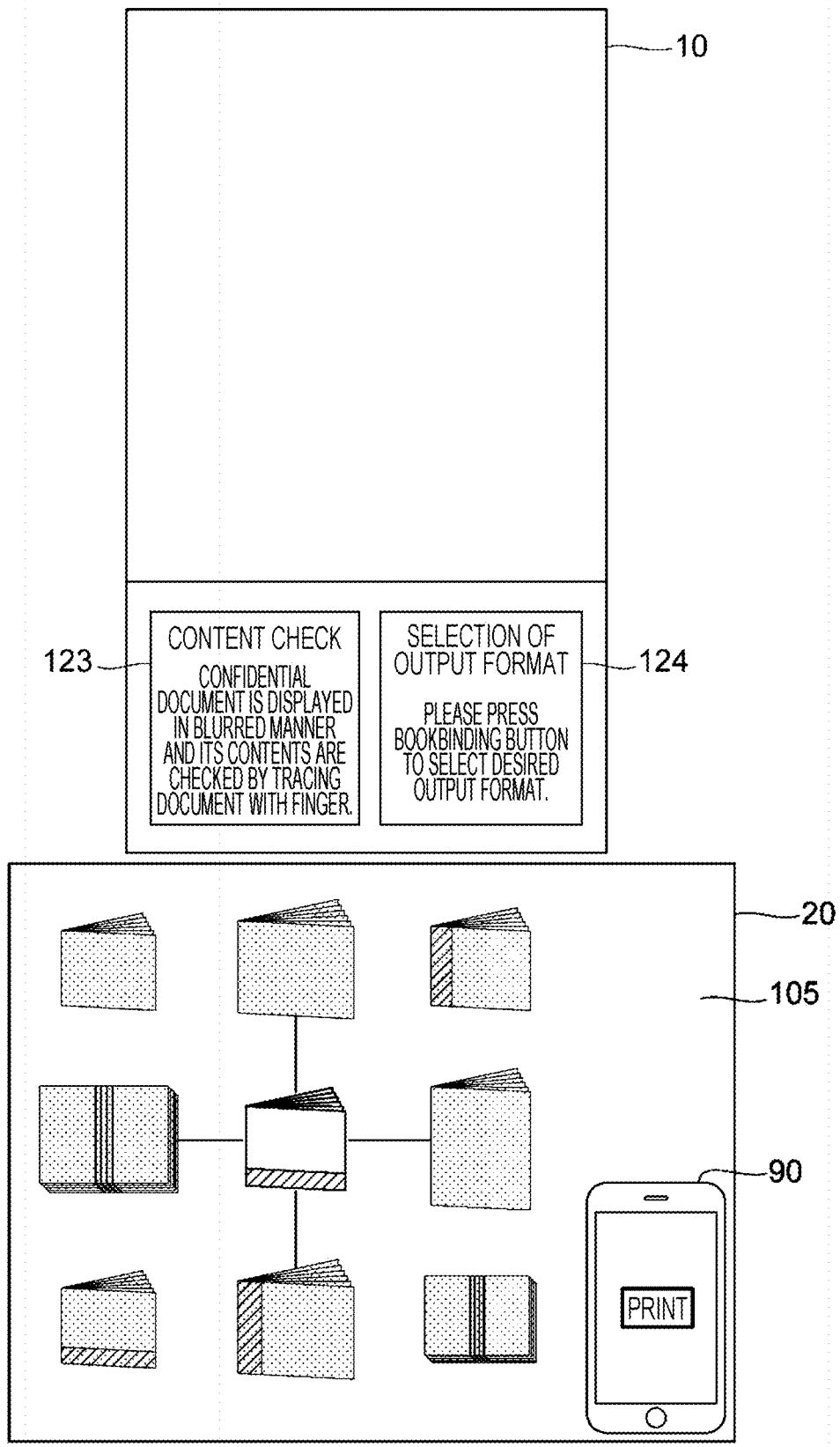
FIG. 8 is a view illustrating a screen display example when an output format is selected in the image processing apparatus.

FIG. 8 is a view illustrating a screen display example when an output format is selected in the image processing apparatus 100. When a bookbinding button (not illustrated) is pressed down by a user in accordance with the guide 124 of FIG. 7, the image processing apparatus 100 displays an output format display screen 105 on the operation stand 20. The output format display screen 105 includes various output formats, and a desired output format is selectable from the output formats. When one of the output formats is selected by a user, the image processing apparatus 100 returns the current screen to the original screen.

Subsequently, in the state where the print instruction screen 103 of FIG. 6 is displayed, when a printing fee is paid and the print button is pressed down by a user, the image processing apparatus 100 starts printing. In this process, the image processing apparatus 100 moves the file images 911 to 913 toward the near side to fade out of sight.

Figure 9:
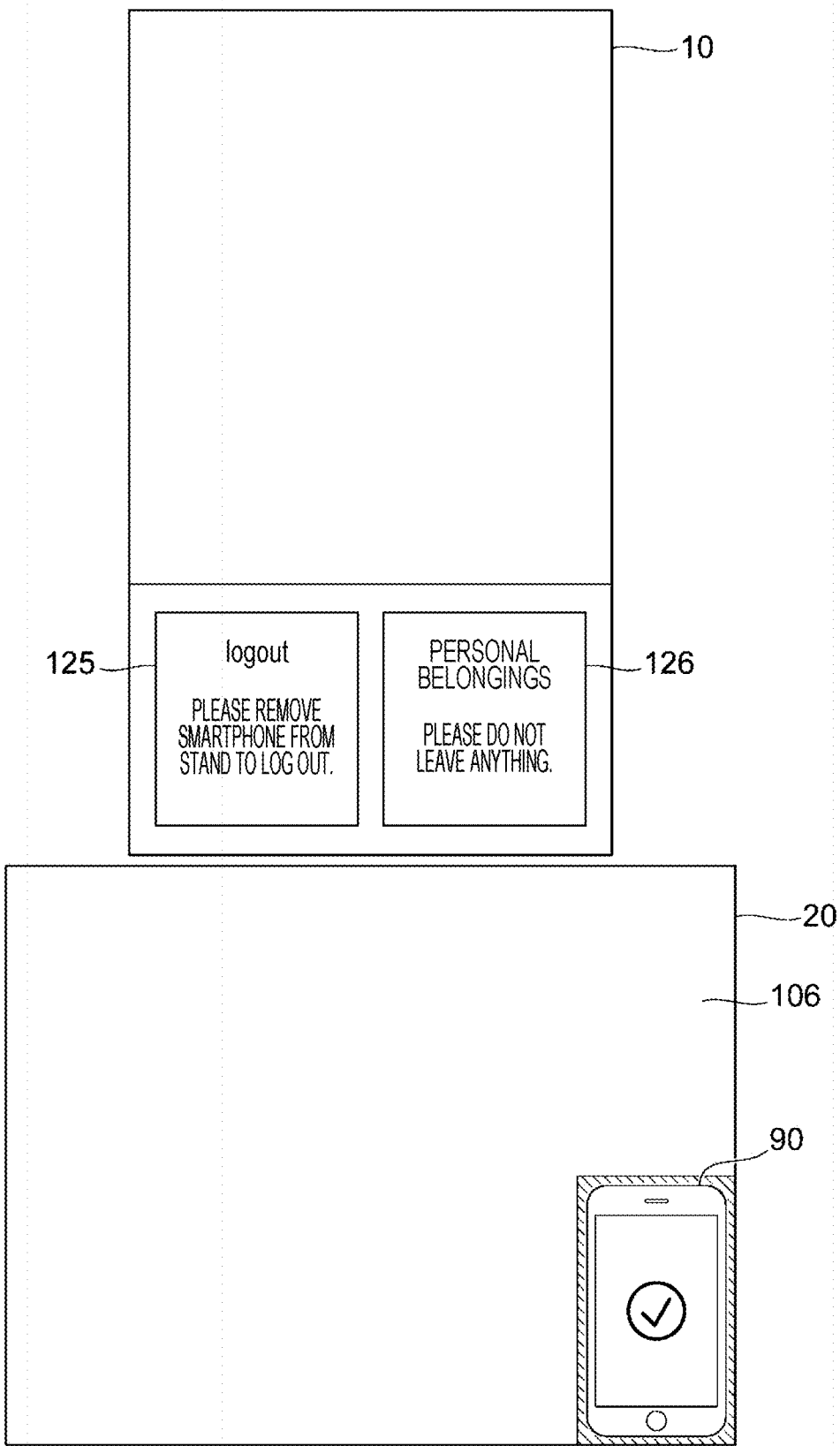
FIG. 9 is a view illustrating a screen display example when a print operation is completed in the image processing apparatus.

FIG. 9 is a view illustrating a screen display example when a print operation is completed in the image processing apparatus 100. When the print operation is completed, the image processing apparatus 100 displays a logout guide screen 106 on the operation stand 20. The logout guide screen 106 includes a faintly shining area around the mobile information terminal 90 for prompting a user to remove the mobile information terminal 90. On the other hand, the image processing apparatus 100 displays a guide 125 regarding logout and a guide 126 regarding personal belongings on the guide display 10. At this point, as illustrated, the application displays a check mark on the display of the mobile information terminal 90 to notify a user of completion of printing.

Thus, when a user removes the mobile information terminal 90 from the operation stand 20, the image processing apparatus 100 performs logout processing, and displays a message indicating completion of logout on the guide display 10 and the operation stand 20. Also, the application displays a message indicating completion of logout on the display of the mobile information terminal 90.

(Screen Display Example at Time of Two-Dimensional Scan Processing)

Figure 10:
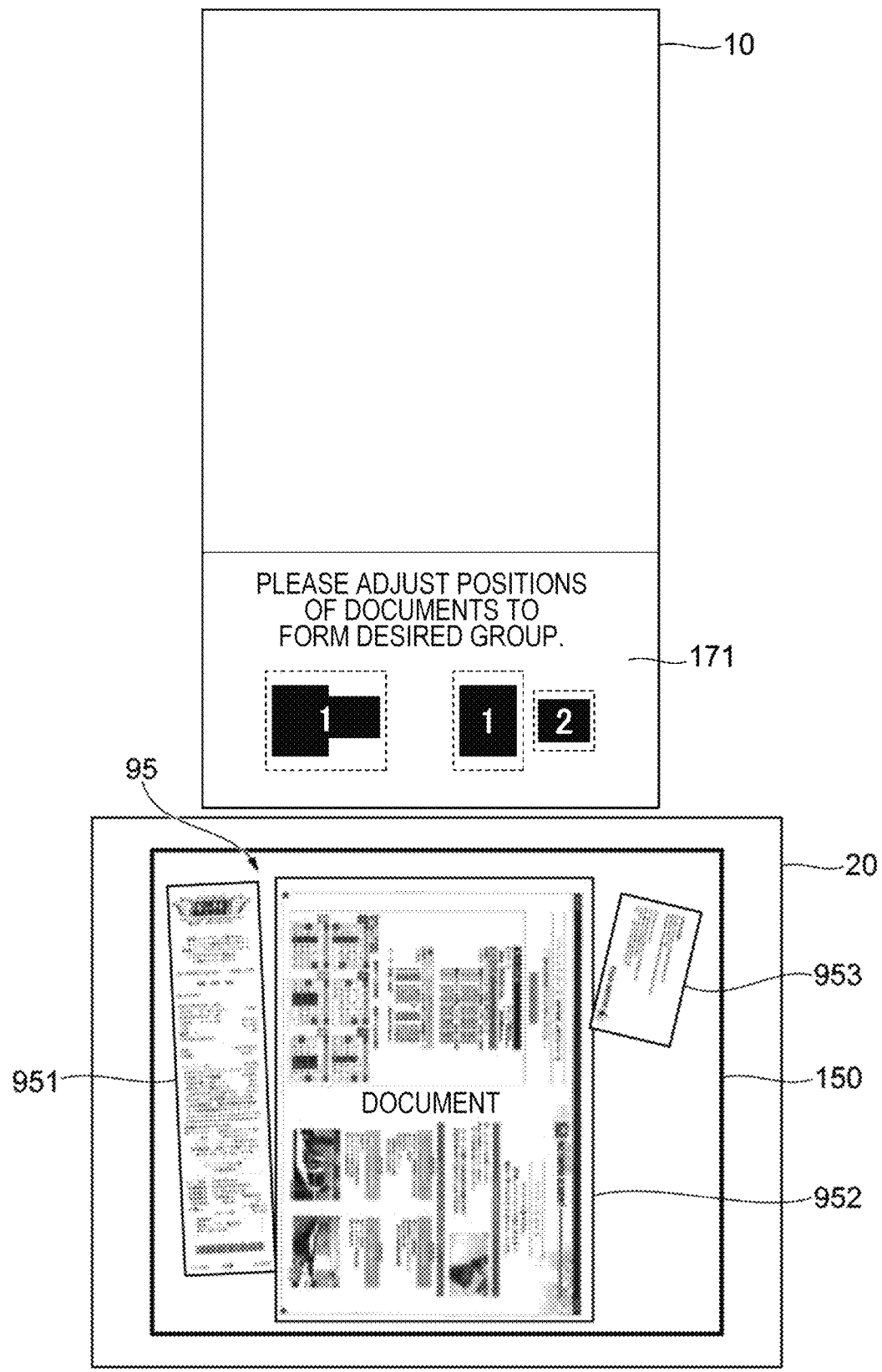
FIG. 10 is a view illustrating a screen display example when documents are placed by a user on an operation stand.
Figure 11:
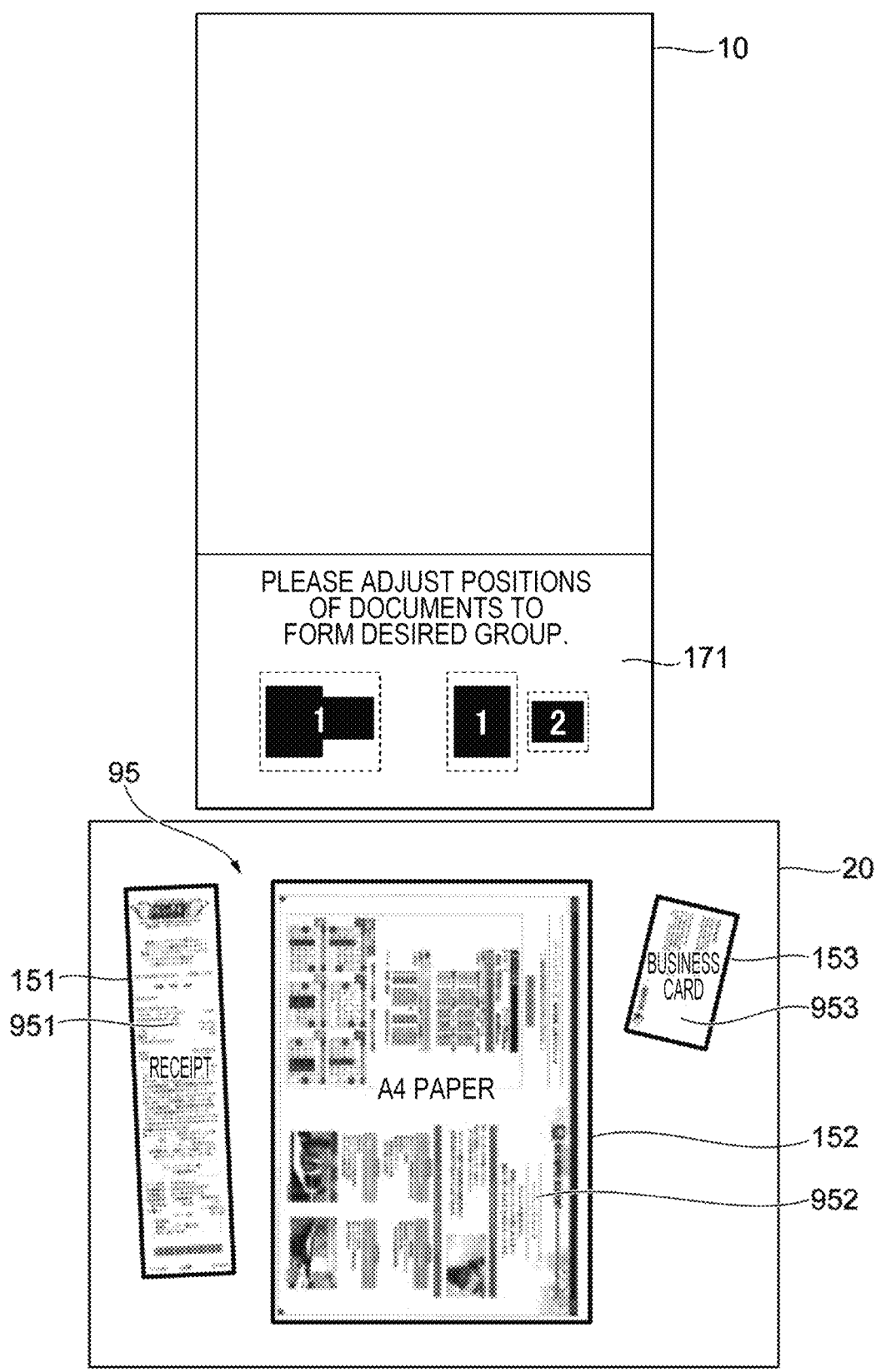
FIG. 11 is a view illustrating a screen display example when documents are placed by a user on an operation stand.

FIGS. 10 and 11 are each a view illustrating a screen display example when the document 95 is placed on the operation stand 20 by a user. When the document 95 is placed on the operation stand 20 by a user, the image processing apparatus 100 displays a guide 171 regarding position adjustment of the document 95 on the guide display 10. First, a case is considered where a receipt 951, an A4 paper 952, and a business card 953 are placed as the document 95 closely to each other on the operation stand 20 by a user in accordance with the guide 171 as illustrated in FIG. 10. In this case, the image processing apparatus 100 recognizes the type of the document 95 as a document, and displays a document type recognition result 150 indicating the type on the operation stand 20. Next, a case is considered where the receipt 951, the A4 paper 952, and the business card 953 are placed as the document 95 apart from each other on the operation stand 20 by a user in accordance with the guide 171 as illustrated in FIG. 11. In this case, the image processing apparatus 100 recognizes the types of the document 95 as a receipt, A4 paper, and a business card, and displays document type recognition results 151 to 153 indicating the types on the operation stand 20.

Subsequently, when a predetermined time elapses with the document 95 placed as illustrated in FIG. 11, the image processing apparatus 100 scans the document 95.

Figure 12:
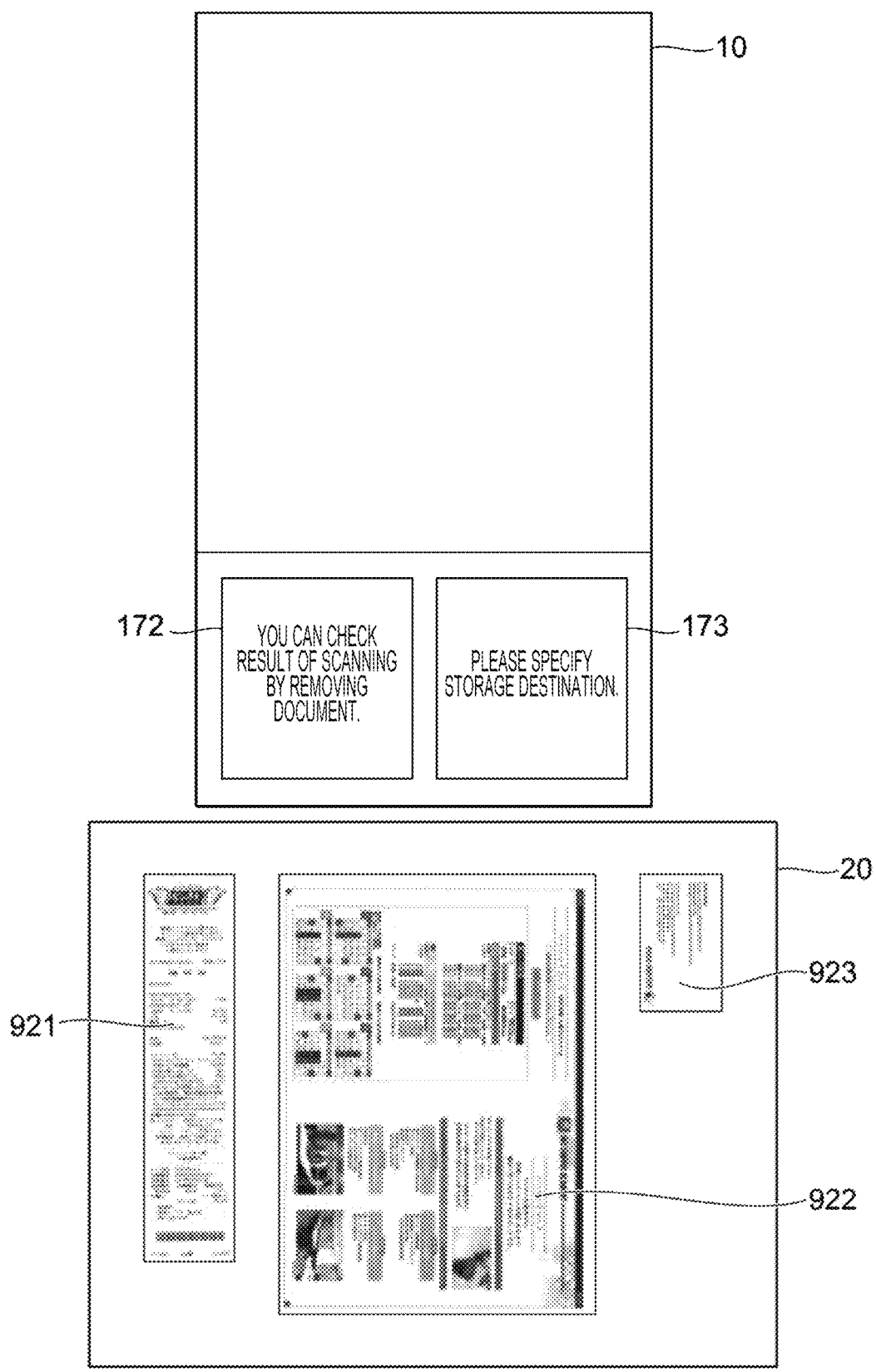
FIG. 12 is a view illustrating a screen display example when two-dimensional scan is completed in the image processing apparatus.

FIG. 12 is a view illustrating a screen display example when the scan is completed in the image processing apparatus 100. When the scan is completed, the image processing apparatus 100 displays a guide 172 regarding removal of the document 95 and a guide 173 regarding storage destination on the guide display 10. When the receipt 951, the A4 paper 952, and the business card 953 are removed from the operation stand 20 by a user in accordance with the guide 172, the image processing apparatus 100 displays a scanned image 921 of the receipt, a scanned image 922 of the A4 paper, and a scanned image 923 of the business card on the operation stand 20. In this process, the image processing apparatus 100 displays the scanned images 921 to 923 in an erect state.

Figure 13:
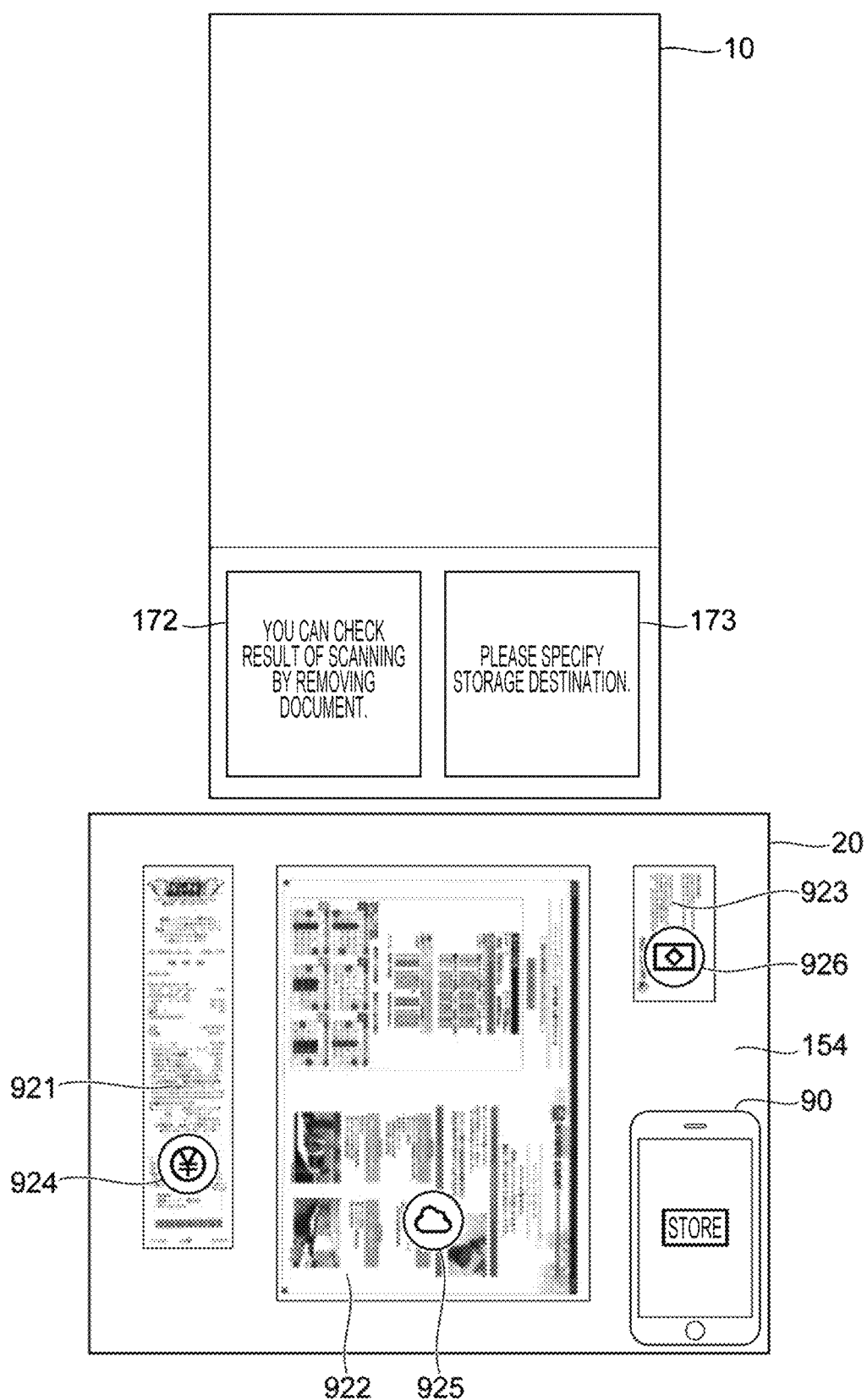
FIG. 13 is a view illustrating a screen display example when a storage operation is started in the image processing apparatus.

FIG. 13 is a view illustrating a screen display example when a storage operation is started in the image processing apparatus 100. When the mobile information terminal 90 is placed on the operation stand 20 by a user, the image processing apparatus 100 displays a storage instruction screen 154 on the operation stand 20. In addition to the scanned images 921 to 923, the storage instruction screen 154 includes storage destination icons 924 to 926 indicating respective storage destinations registered for the types of document in the mobile information terminal 90. Here, the storage destination icon 924 indicates the expense settlement cloud system registered as the storage destination of scan data of receipt. Also, the storage destination icon 925 indicates the document management cloud system registered as the storage destination of scan data of A4 paper. In addition, the storage destination icon 926 indicates the business card management cloud system registered as the storage destination of scan data of business card. In this process, the application displays a storage button on the display of the mobile information terminal 90. When a storage fee is paid and the storage button is pressed down on the storage instruction screen 154 by a user, the image processing apparatus 100 stores the scan data of the receipt, A4 paper, and business card in the respective corresponding cloud systems.

Subsequently, as illustrated in FIG. 9, the image processing apparatus 100 displays the guide 125 regarding logout, and the guide 126 regarding personal belongings on the guide display 10. Thus, when a user removes the mobile information terminal 90 from the operation stand 20, the image processing apparatus 100 performs logout processing, and displays a message indicating completion of logout on the guide display 10 and the operation stand 20. Also, the application displays a message indicating completion of logout on the mobile information terminal 90.

(Screen Display Example at Time of Three-Dimensional Scan Processing)

When a predetermined time elapses with the three-dimensional object 97 placed on the operation stand 20, the image processing apparatus 100 scans the three-dimensional object 97. When the three-dimensional object 97 is removed from the operation stand 20 by a user, the image processing apparatus 100 displays a result of scanning the three-dimensional object 97 on the guide display 10 and the operation stand 20.

Figure 14:
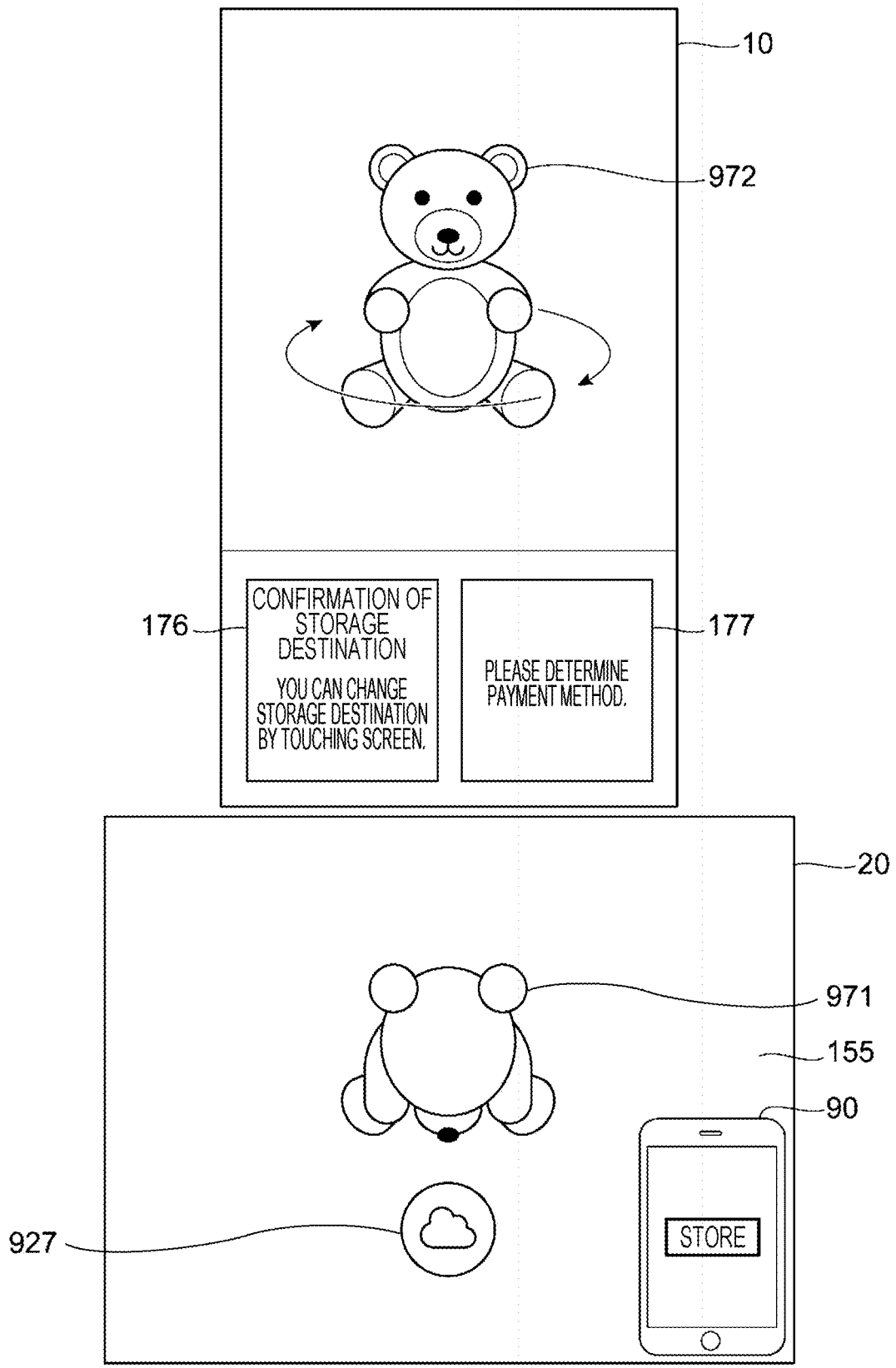
FIG. 14 is a view illustrating a screen display example when three-dimensional scan is completed in the image processing apparatus.

FIG. 14 is a view illustrating a screen display example when the scan is completed in the image processing apparatus 100. When the scan is completed, the image processing apparatus 100 displays a planar image 971 of a scan result on the operation stand 20. On the other hand, the image processing apparatus 100 displays a three-dimensional image 972 of a scan result on the guide display 10. The three-dimensional image 972 is displayed while being rotated as indicated by an arrow in FIG. 14, thereby allowing a user to check the three-dimensional shape of the scan result. In addition, the image processing apparatus 100 displays a guide 176 regarding confirmation of a storage destination and a guide 177 regarding determination of a payment method on the guide display 10. When the mobile information terminal 90 is placed on the operation stand 20 by a user in this state, the image processing apparatus 100 displays a storage instruction screen 155 on the operation stand 20. In addition to the planar image 971 of the scan result, the storage instruction screen 155 includes a storage destination icon 927 indicating a storage destination registered in the mobile information terminal 90. Here, the storage destination icon 927 indicates a cloud system which is registered as the storage destination of scan data of three-dimensional objects. In this process, the application displays a storage button on the display of the mobile information terminal 90. When a storage fee is paid and the storage button is pressed down on the storage instruction screen 155 by a user, the image processing apparatus 100 stores the scan data of the three-dimensional object 97 in a corresponding cloud system.

Subsequently, as illustrated in FIG. 9, the image processing apparatus 100 displays the guide 125 regarding logout, and the guide 126 regarding personal belongings on the guide display 10. Thus, when the mobile information terminal 90 is removed from the operation stand 20 by a user, the image processing apparatus 100 performs logout processing, and displays a message indicating completion of logout on the guide display 10 and the operation stand 20. Also, the application displays a message indicating completion of logout on the mobile information terminal 90.

[Operation Example of Control Device]

Figure 15:
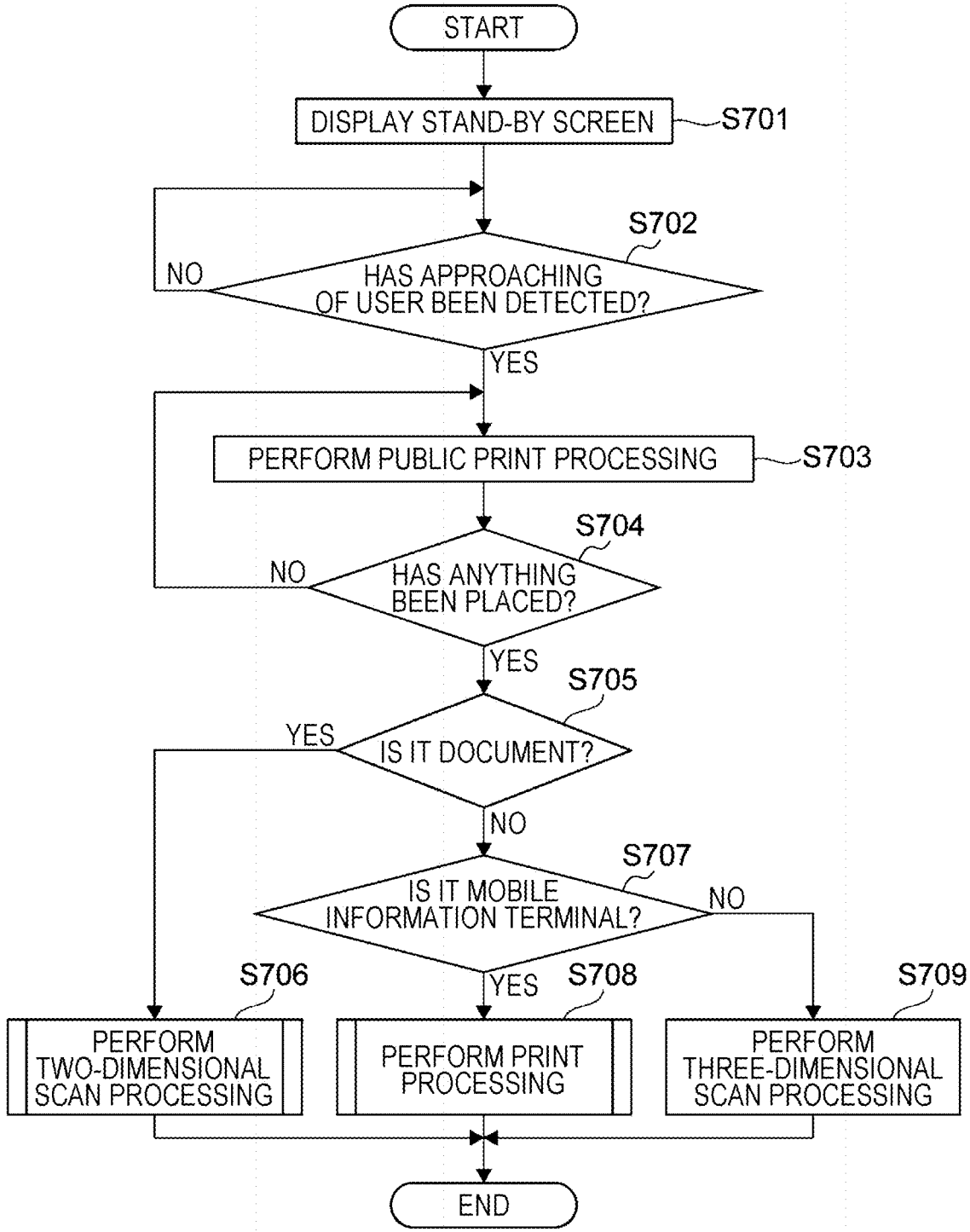
FIG. 15 is a flowchart illustrating an operation example of the control device in the exemplary embodiment of the invention.

FIG. 15 is a flowchart illustrating an operation example of the control device 70 that performs such screen display.

As illustrated, in the control device 70, the display controller 71 first displays the stand-by screen 101 on the guide display 10 (step 701).

Next, the detection controller 73 determines whether or not a human sensor has detected approach of a user (step 702). When it is determined that the human sensor has not detected approach of a user, the detection controller 73 repeats step 702, whereas when it is determined that the human sensor has detected approach of a user, the control device 70 performs public print processing to print information necessary for a user in a public space (step 703).

Subsequently, the imaging controller 75 determines whether or not the imager 60 has detected anything placed on the operation stand 20 (step 704). When it is determined that the imager 60 has not detected anything placed on the operation stand 20, the control device 70 continues the public print processing.

On the other hand, when it is determined that the imager 60 has detected anything placed on the operation stand 20, the imaging controller 75 determines whether or not the imager 60 has detected the document 95 placed on the operation stand 20 (step 705). As a result, when it is determined that the imager 60 has detected the document 95 placed on the operation stand 20, the control device 70 performs two-dimensional scan processing (step 706).

Also, when it is determined that the imager 60 has not detected the document 95 placed on the operation stand 20, the imaging controller 75 determines whether or not the imager 60 has detected the mobile information terminal 90 placed on the operation stand 20 (step 707). As a result, when it is determined that the imager 60 has detected the mobile information terminal 90 placed on the operation stand 20, the control device 70 performs print processing (step 708). At this point, in the control device 70, it is assumed that the communication controller 76 obtains authentication information registered in the mobile information terminal 90 before the print processing is performed, makes authentication and Wi-Fi connection setting based on the authentication information, and receives registration information from the mobile information terminal 90 via W Fi. On the other hand, when it is determined that the imager 60 has not detected the mobile information terminal 90 placed on the operation stand 20, the control device 70 performs three-dimensional scan processing (step 709).

Figure 16:
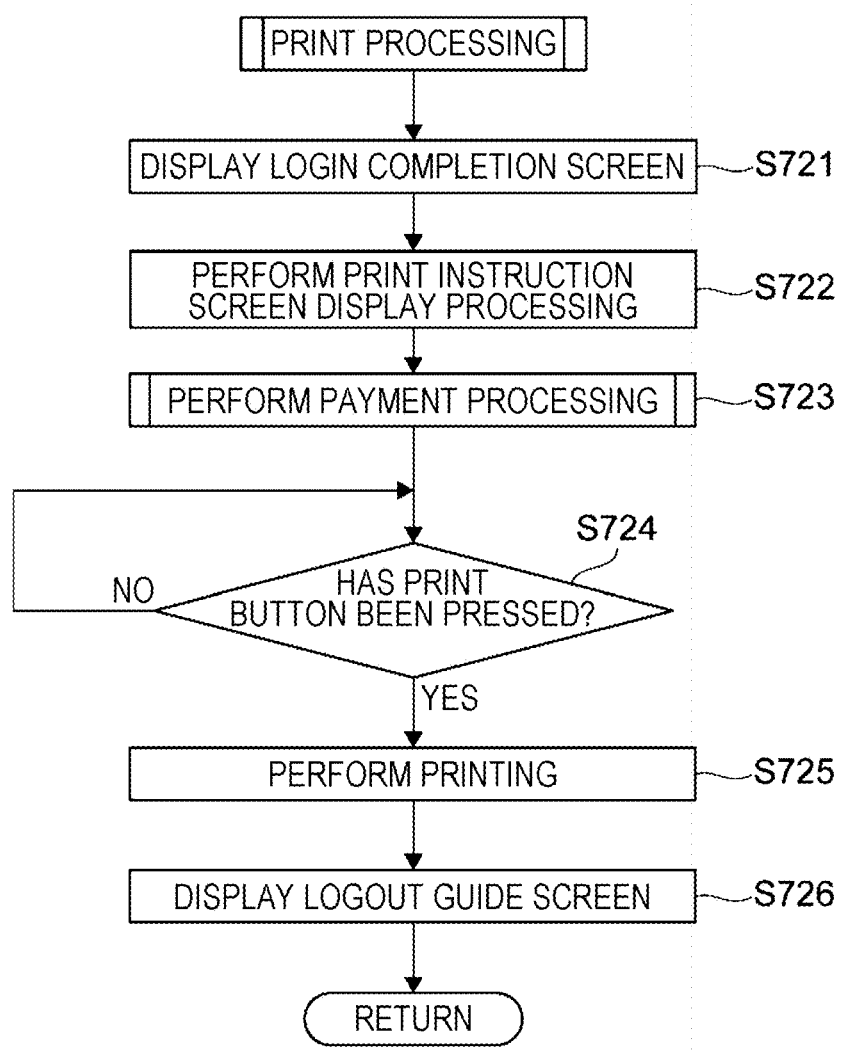
FIG. 16 is a flowchart illustrating an operation example of the control device when print processing is performed.

FIG. 16 is a flowchart illustrating an operation example of the control device 70 when the print processing in step 708 of FIG. 15 is performed.

As illustrated, the control device 70 first displays the login completion screen 102 on the guide display 10 and the operation stand 20 (step 721). Specifically, the display controller 71 displays part of the login completion screen 102 on the guide display 10, and the projection controller 72 displays the remaining part of the login completion screen 102 on the operation stand 20 using the projector 30.

Next, the projection controller 72 performs print instruction screen display processing to display a print instruction screen 103 on the operation stand 20 using the projector 30, the print instruction screen 103 for giving an instruction to print a print reservation file (step 722).

Subsequently, the payment processor 77 performs payment processing by a payment method registered for the print reservation file in the registration information or a payment method selected then (step 723). The communication controller 76 then determines whether or not notification that the print button has been pressed down in the mobile information terminal 90 has been received via Wi-Fi (step 724). When it is determined that notification that the print button has been pressed down in the mobile information terminal 90 has not been received via Wi-Fi, the communication controller 76 repeats step 724, whereas when it is determined that notification that the print button has been pressed down in the mobile information terminal 90 has been received via Wi-Fi, the print controller 74 performs control so that printing is made by the printer 50 (step 725).

Subsequently, when printing by the printer 50 is completed, the projection controller 72 displays the logout guide screen 106 on the operation stand 20 using the projector 30 (step 726).

Figure 17:
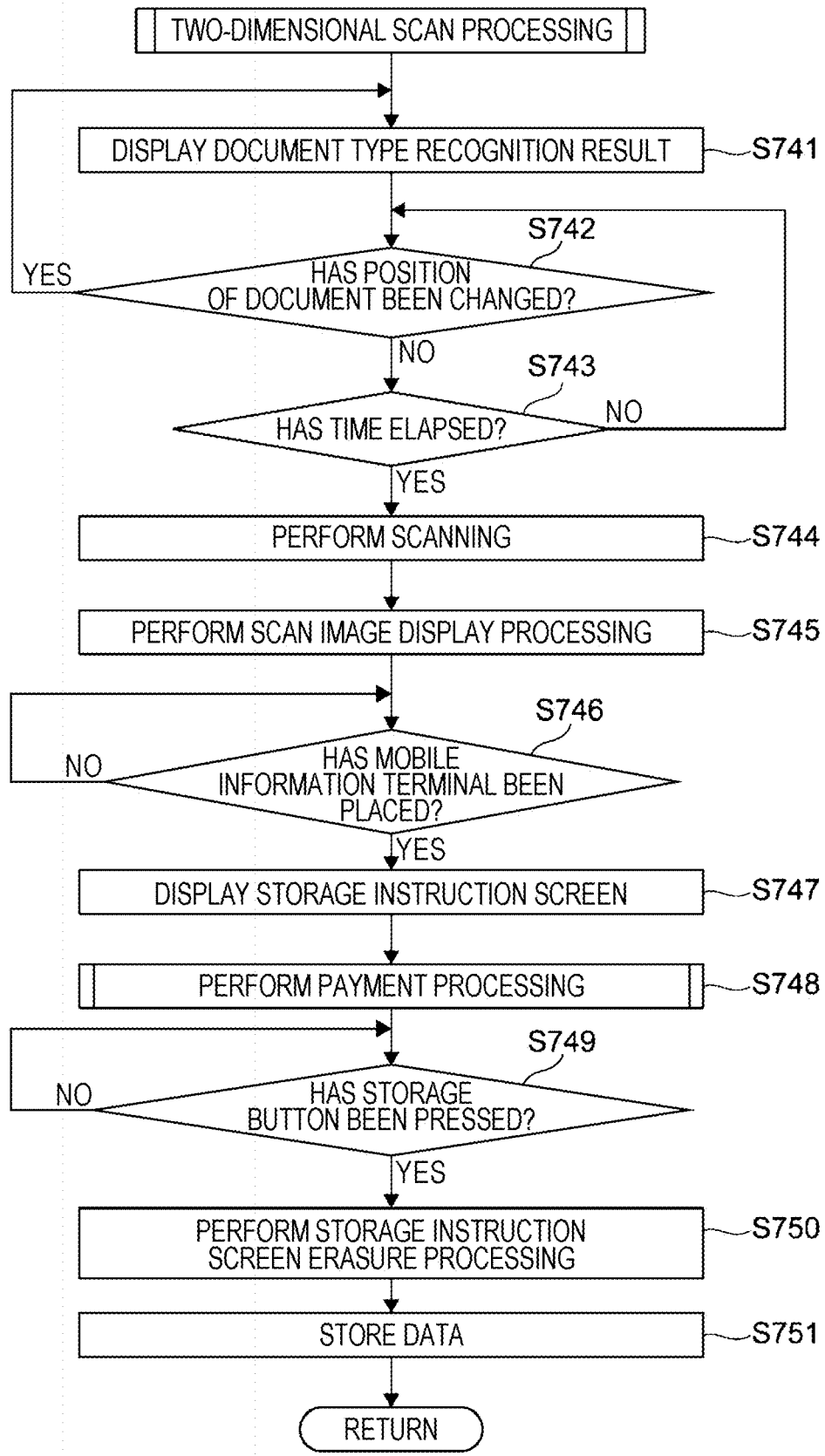
FIG. 17 is a flowchart illustrating an operation example of the control device when two-dimensional scan processing is performed.

FIG. 17 is a flowchart illustrating an operation example of the control device 70 when the two-dimensional scan processing in step 706 of FIG. 15 is performed.

As illustrated, the control device 70 first displays a document type recognition result on the operation stand 20 (step 741). Specifically, the imaging controller 75 obtains the image of the document 95 captured by the imager 60, the document type recognizes 78 recognizes the type of the document 95, for instance, by pattern matching, and the projection controller 72 displays a result of the recognition on the operation stand 20 using the projector 30.

Next, the imaging controller 75 determines whether or not the imager 60 has detected change in the position of the document 95 (step 742). When it is determined that the imager 60 has detected change in the position of the document 95, the control device 70 performs step 741 again. When it is determined that the imager 60 has not detected change in the position of the document 95, the imaging controller 75 determines whether or not a predetermined time has elapsed (step 743). When it is determined that a predetermined time has not elapsed, the imaging controller 75 performs step 742 again.

On the other hand, when it is determined that a predetermined time has elapsed, the imaging controller 75 scans the document 95 placed on the operation stand 20 using the imager 60 (step 744). Thus, the projection controller 72 performs scan image display processing to display the scanned image 92 on the operation stand 20 using the projector 30 (step 745).

Next, the imaging controller 75 determines whether or not the imager 60 has detected the mobile information terminal 90 placed on the operation stand 20 (step 746). When it is determined that the imager 60 has not detected the mobile information terminal 90 placed on the operation stand 20, the imaging controller 75 repeats step 746, whereas when it is determined that the imager 60 has detected the mobile information terminal 90 placed on the operation stand 20, the projection controller 72 displays a storage instruction screen on the operation stand 20 using the projector 30, the storage instruction screen for giving an instruction to store scan data (step 747). At this point, it is assumed that the communication controller 76 obtains authentication information registered in the mobile information terminal 90, makes authentication and Wi-Fi connection setting based on the authentication information, and receives registration information from the mobile information terminal 90 via Wi-Fi.

Subsequently, the payment processor 77 performs payment processing by a payment method registered for the type of the document 95 in the registration information or a payment method selected then (step 748). The communication controller 76 then determines whether or not notification that the storage button has been pressed down in the mobile information terminal 90 has been received via Wi-Fi (step 749). When it is determined that notification that the storage button has been pressed down in the mobile information terminal 90 has not been received via Wi-Fi, the communication controller 76 repeats step 749, whereas when it is determined that notification that the storage button has been pressed down in the mobile information terminal 90 has been received via Wi-Fi, the projection controller 72 performs storage instruction screen erasure processing to erase the storage instruction screen 154 (step 750). The communication controller 76 then transmits the scan data of the document 95 to a storage destination registered for the type of the document 95 via the communication I/F 5, and stores the scan data (step 751).

[Screen Display Example of Image Processing Apparatus at Time of Payment Processing]

In the exemplary embodiment, in response to an operation to move or place a medium closer to or on the operation stand 20, the image processing apparatus 100 displays on the operation stand 20 guidance information that guides a position, at which information associated with the medium is readable, on the operation stand 20. Here, the medium includes a card and the mobile information terminal 90 as an example. When the medium is a card, information associated with the medium includes information recorded on the card and information on the mobile information terminal 90 in which the information on the card is registered. When the medium is the mobile information terminal 90, information associated with the medium includes information recorded or registered in the mobile information terminal 90 as an example. When information on a card is registered in the mobile information terminal 90, the information on the card is also an example of information associated with the medium. It is to be noted that information recorded on a medium refers to information physically written in the medium itself, and information registered in a medium refers to information registered in association with identification information that identifies the medium or an owner of the medium. The information registered in a medium is not necessarily information physically written in the medium itself. Also, when a user performs authentication by placing the mobile information terminal 90 on the operation stand 20, guidance information may be displayed when the user moves the mobile information terminal 90 closer to the operation stand 20 and information is readable. However, a description will be given assuming that the medium is a card and in response to an operation to place the medium on the operation stand 20, guidance information is displayed.

Figure 18:
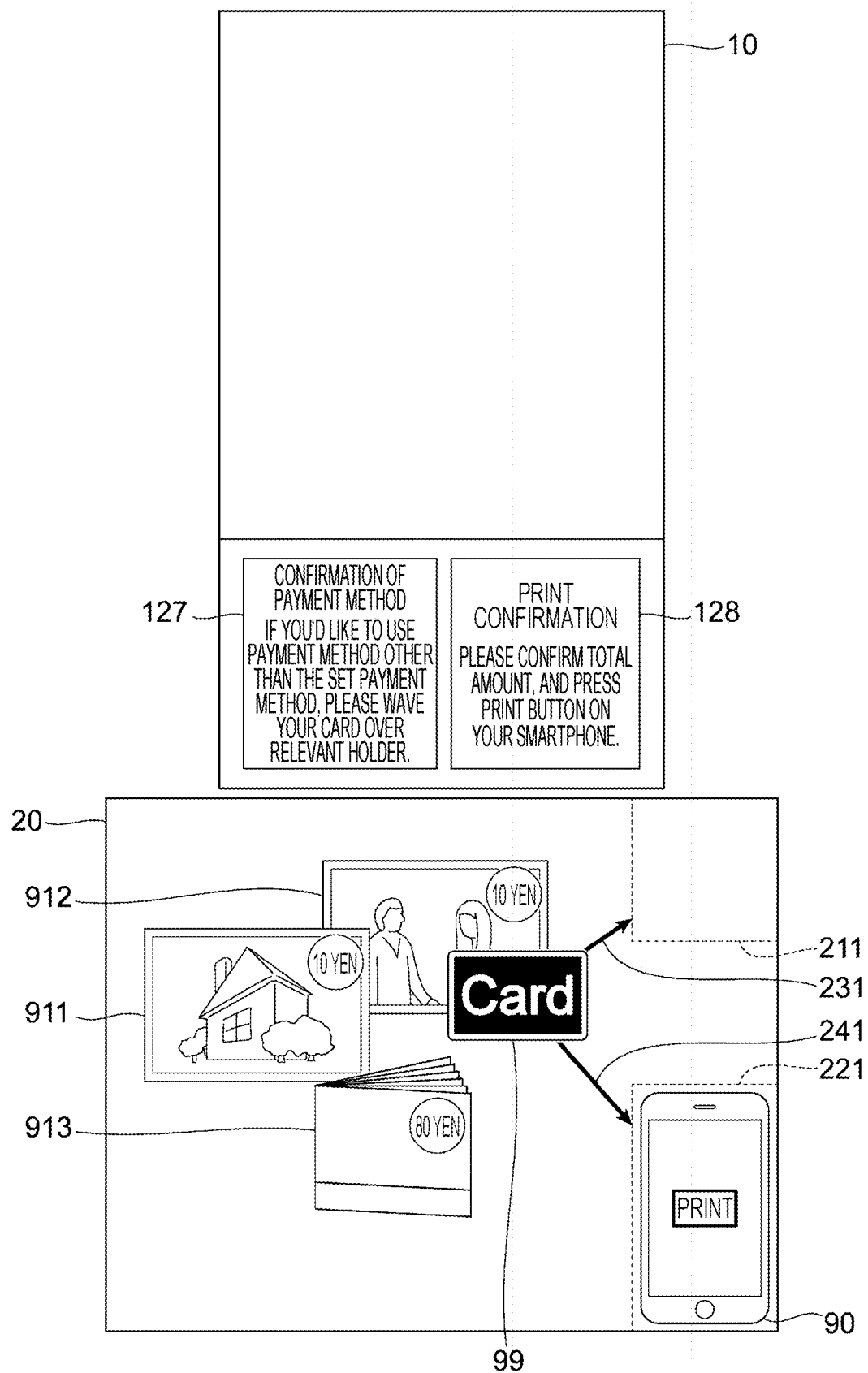
FIG. 18 is a view illustrating a screen display example displayed in payment processing in print processing.

FIG. 18 is a view illustrating a screen display example displayed in the payment processing in step 723 of FIG. 16. When a user places a card 99, for instance, on a file image 912 with the print instruction screen 103 of FIG. 6 displayed, the image processing apparatus 100 displays on the operation stand 20 guidance information on payment using the card 99 of a printing fee for a print reservation file corresponding to the file image 912.

Specifically, when the card 99 is a card not registered (hereinafter referred to as an "unregistered card") in the mobile information terminal 90, guidance information is displayed, which guides a user to a position, at which information recorded on the card 99 is readable by a card reader corresponding to the card 99, on the operation stand 20. In FIG. 18, a card reader reading area 211 is the position, at which information is readable by a card reader, on the operation stand 20, and guidance information is displayed, which indicates with an arrow 231 a direction from the position at which the card 99 is placed to the card reader reading area 211. Alternatively, guidance information may be displayed, which indicates the position of the card reader reading area 211 by making the area brighter. Here, only the card reader reading area 211 is guided as the position, at which information is readable by a card reader, on the operation stand 20. However, without being limited to this, different card reader reading areas may be guided according to the type of the card 99.

On the other hand, when the card 99 is a card registered (hereinafter referred to as an "registered card") in the mobile information terminal 90, guidance information is displayed, which guides a user to a position at which the mobile information terminal 90 is placed on the operation stand 20. Here, it is assumed that the mobile information terminal 90 is placed on a position, at which information is readable by an NFC reader or the imager 60. In FIG. 18, let a mobile information terminal area 221 be the position at which the mobile information terminal 90 is placed on the operation stand 20, and guidance information is displayed, which indicates, with an arrow 241, the direction from the position at which the card 99 is placed to the mobile information terminal area 221. Alternatively, guidance information may be displayed, which indicates the position of the mobile information terminal area 221 by making the area brighter.

In this manner when guidance information is displayed on the operation stand 20, which guides the position, at which information is readable by a card reader, on the operation stand 20 or the position at which the mobile information terminal 90 is placed on the operation stand 20, a user moves the card 99 to the position, at which information is readable by a card reader, on the operation stand 20 or the position at which the mobile information terminal 90 is placed on the operation stand 20, in accordance with the guidance information. In this process, the image processing apparatus 100 may move the file image 912 as if the file image 912 follows the card 99. When the information recorded on the card 99 or the information registered in the mobile information terminal 90 is read, and printing fee payment processing is completed, the display mode of the file image 912 may be changed (for instance, the file image 912 may be deleted).

When multiple file images are displayed on the operation stand 20, a user may place the card 99 on individual file images, and the image processing apparatus 100 may display guidance information for individual print reservation files corresponding to the individual file images, and may perform printing fee payment processing. For instance, in the above situation, when guidance information for the file image 912 is displayed and printing fee payment processing is performed, subsequently, guidance information for a file image 911 may be displayed and printing fee payment processing may be performed.

Continuously, guidance information for a file image 913 may be displayed and printing fee payment processing may be performed. In this case, an image combining the file images 911 to 913, is an example of an image representing a document, and the file images 911 to 913 are an example of multiple partial images respectively representing multiple documents. Alternatively, when multiple file images are displayed on the operation stand 20, and for instance, a user places the card 99 on an overlapping area of the multiple file images, the image processing apparatus 100 may display guidance information for the multiple file images and perform printing fee payment processing collectively for multiple print reservation files corresponding to the multiple file images.

In addition, in the above situation, the information recorded on the card 99 or the information registered in the mobile information terminal 90 is used for printing fee payment processing for a print reservation file in the above. However, in a more generalized manner, the information may be used for some processing to be performed on a print reservation file.

Figure 19:
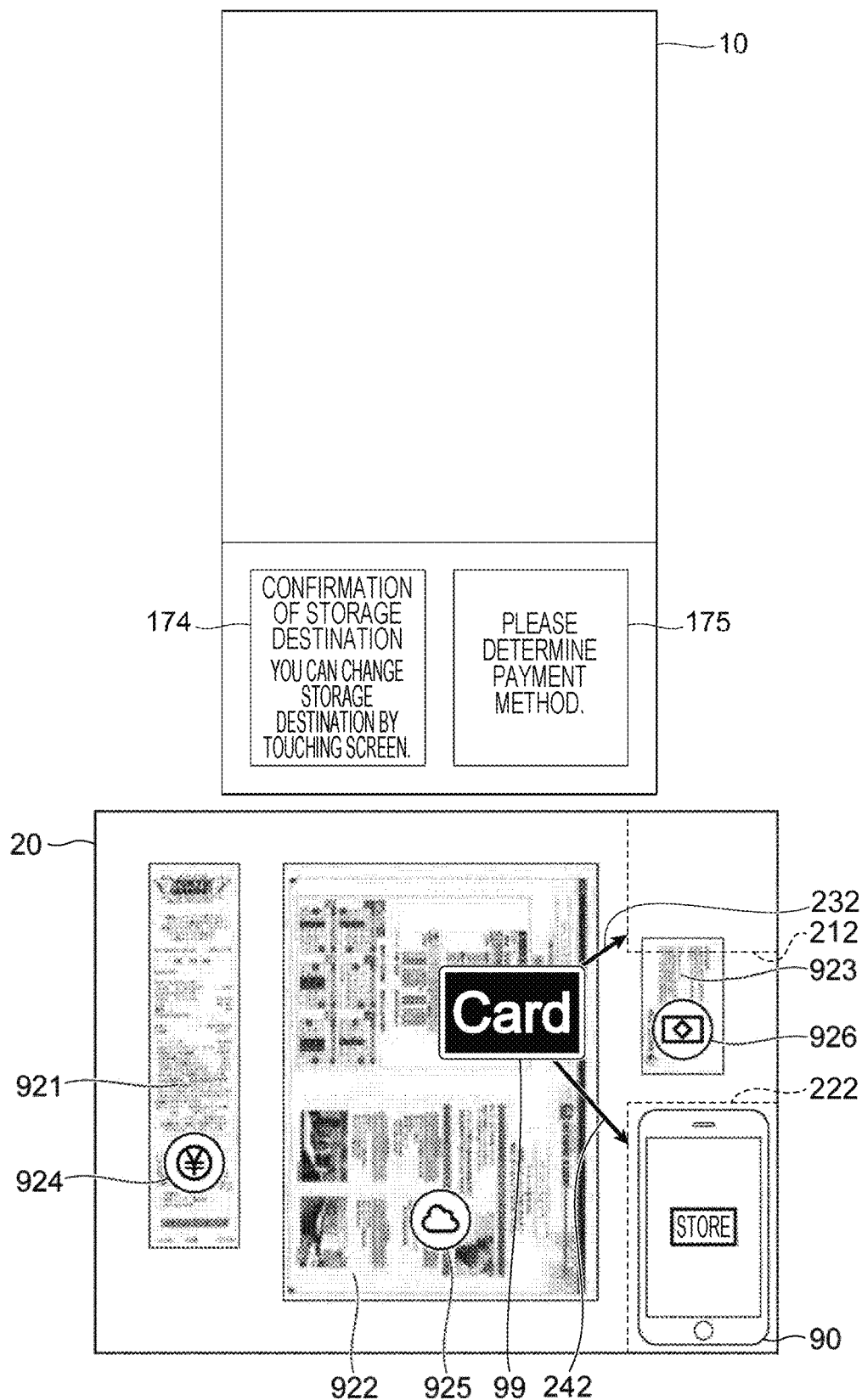
FIG. 19 is a view illustrating a screen display example displayed in payment processing in two-dimensional scan processing.

FIG. 19 is a view illustrating a screen display example displayed in the payment processing in step 748 of FIG. 17. When a user places the card 99, for instance, on a scan image 922 with the storage instruction screen 154 of FIG. 13 displayed, the image processing apparatus 100 displays on the operation stand 20 guidance information on payment using the card 99 of a storage fee for scan data corresponding to the scan image 922.

Specifically, when the card 99 is a card not registered (unregistered card) in the mobile information terminal 90, guidance information is displayed, which guides a user to a position, at which information recorded on the card 99 is readable by a card reader corresponding to the card 99, on the operation stand 20. In FIG. 19, a card reader reading area 212 is the position, at which information is readable by a card reader, on the operation stand 20, and guidance information is displayed, which indicates with an arrow 232 a direction from the position at which the card 99 is placed to the card reader reading area 212. Alternatively, guidance information may be displayed, which indicates the position of the card reader reading area 212 by making the area brighter. Here, only the card reader reading area 212 is guided as the position, at which information is readable by a card reader, on the operation stand 20. However, without being limited to this, different card reader reading areas may be guided according to the type of the card 99.

On the other hand, when the card 99 is a card registered (registered card) in the mobile information terminal 90, guidance information is displayed, which guides a user to a position at which the mobile information terminal 90 is placed on the operation stand 20. Here, it is assumed that the mobile information terminal 90 is placed on a position, at which information is readable by an NFC reader or the imager 60. In FIG. 19, let a mobile information terminal area 222 be the position at which the mobile information terminal 90 is placed on the operation stand 20, and guidance information is displayed, which indicates, with an arrow 242, the direction from the position at which the card 99 is placed to the mobile information terminal area 222. Alternatively, guidance information may be displayed, which indicates the position of the mobile information terminal area 222 by making the area brighter.

In this manner when guidance information is displayed on the operation stand 20, which guides the position, at which information is readable by a card reader, on the operation stand 20 or the position at which the mobile information terminal 90 is placed on the operation stand 20, a user moves the card 99 to the position, at which information is readable by a card reader, on the operation stand 20 or the position at which the mobile information terminal 90 is placed on the operation stand 20, in accordance with the guidance information. In this process, the image processing apparatus 100 may move the scan image 922 as if the scan image 922 follows the card 99. When the information recorded on the card 99 or the information registered in the mobile information terminal 90 is read, and printing fee payment processing is completed, the display mode of the scan image 922 may be changed.

When multiple scan images are displayed on the operation stand 20, a user may place the card 99 on individual scan images, and the image processing apparatus 100 may display guidance information for individual pieces of scan data corresponding to the individual scan images, and may perform storage fee payment processing. For instance, in the above situation, when guidance information for the scan image 922 is displayed and storage fee payment processing is performed, subsequently, guidance information for a scan image 921 may be displayed and storage fee payment processing may be performed. Continuously, guidance information for a scan image 913 may be displayed and storage fee payment processing may be performed. In this case, an image combining the scan images 921 to 923, is an example of an image representing a document, and the scan images 921 to 923 are an example of multiple partial images respectively representing multiple documents. Alternatively, when multiple scan images are displayed on the operation stand 20, and for instance, a user places the card 99 on an overlapping area of the multiple scan images, the image processing apparatus 100 may display guidance information for the multiple scan images and perform storage fee payment processing collectively for multiple pieces of scan data corresponding to the multiple scan images.

In addition, in the above situation, the information recorded on the card 99 or the information registered in the mobile information terminal 90 is used for storage fee payment processing for scan data in the above. However, in a more generalized manner, the information may be used for some processing to be performed on scan data.

[Operation Example at Time of Payment Processing of Control Device]

Figure 20:
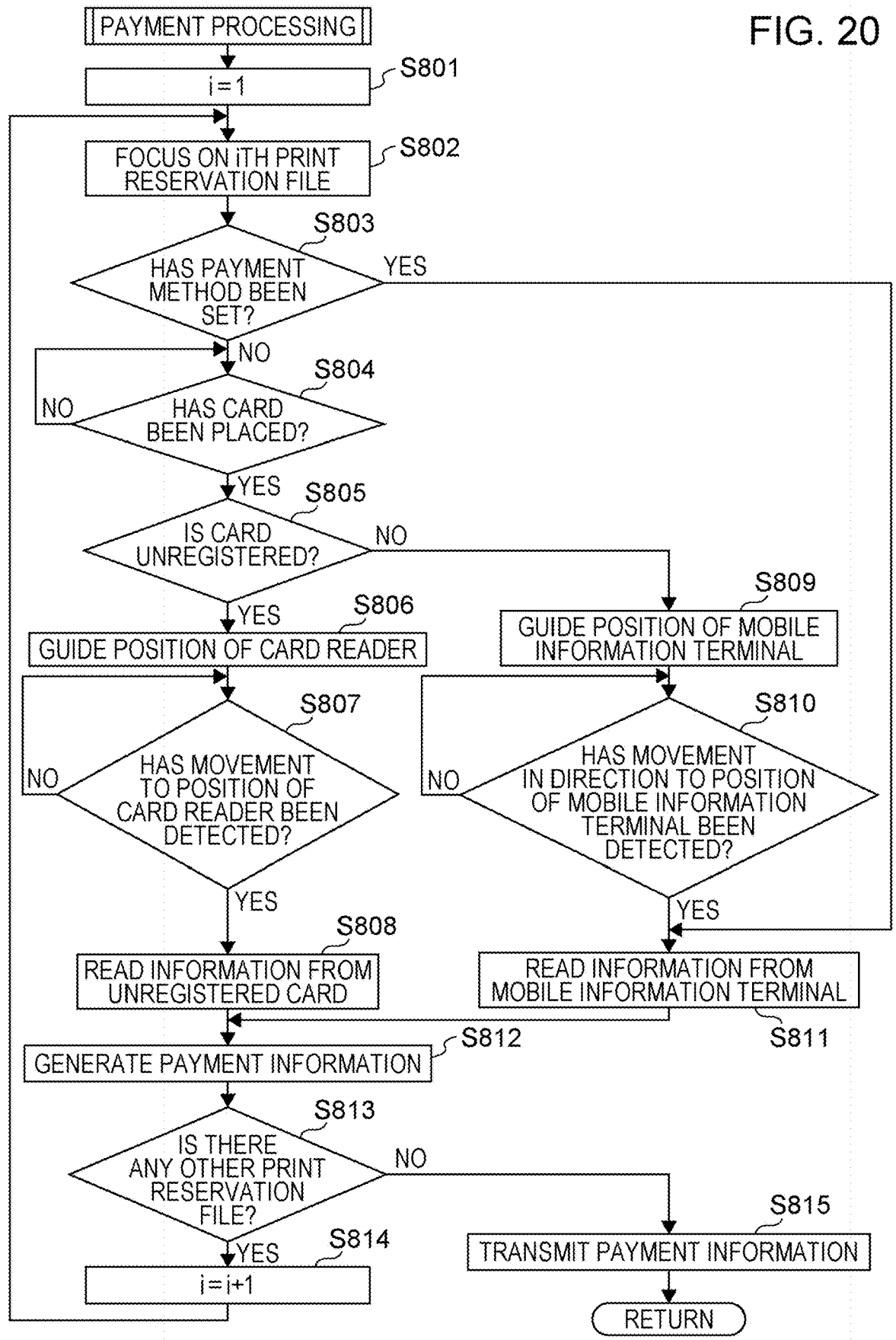
FIG. 20 is a flowchart illustrating an operation example of the control device when payment processing is performed.

FIG. 20 is a flowchart illustrating an operation example of the control device 70 when payment processing in step 723 of FIG. 16 or step 748 of FIG. 17 is performed. Before the operation is performed, as described above, it is assumed that when the mobile information terminal 90 is placed on the operation stand 20, the control device 70 has obtained registration information from the mobile information terminal 90 via Wi-Fi in step 707 of FIG. 15 or step 746 of FIG. 17.

As illustrated, in the control device 70, the payment processor 77 first sets counter i for counting the print reservation file to "1" (step 801).

Subsequently, the payment processor 77 refers to the registration information, and focuses on ith print reservation file (step 802). The payment processor 77 then determines whether a payment method is set for the focused print reservation file in the registration information (step 803). When it is determined that a payment method is not set for the focused print reservation file, the imaging controller 75 determines whether or not the imager 60 has detected that the card 99 has been placed on the operation stand 20 (step 804). When it is determined that the imager 60 has not detected that the card 99 has been placed on the operation stand 20, the imaging controller 75 repeats step 804, whereas when it is determined that the imager 60 has detected that the card 99 has been placed on the operation stand 20, the payment processor 77 refers to the registration information, and determines whether or not the card 99 is an unregistered card (step 805).

As a result, when it is determined that the card 99 is an unregistered card, the projection controller 72 uses the projector 30 to display guidance information on the operation stand 20, which guides the position, at which information recorded on the unregistered card is readable by a card reader (step 806). Thus, a user performs an operation on the operation stand 20 to move the unregistered card to the position, at which the recorded information is readable by a card reader. Then the imaging controller 75 determines whether or not the imager 60 has detected movement of the unregistered card (step 807). When it is determined that the imager 60 has not detected movement of the unregistered card, the imaging controller 75 repeats step 807, whereas when it is determined that the imager 60 has detected movement of the unregistered card, the communication controller 76 reads information from the unregistered card using a card reader (step 808).

On the other hand, when it is determined that the card 99 is not an unregistered card, that is, when it is determined that the card 99 is a registered card, the projection controller 72 uses the projector 30 to display guidance information on the operation stand 20, which guides the position, at which the mobile information terminal 90 is placed, in which the information on the registered card is registered (step 809). Thus, a user performs an operation on the operation stand 20 to move the registered card to the position, at which the mobile information terminal 90 is placed, in which the information on the registered card is registered. Then the imaging controller 75 determines whether or not the imager 60 has detected movement of the registered card (step 810). When it is determined that the imager 60 has not detected movement of the registered card, the imaging controller 75 repeats step 810, whereas when it is determined that the imager 60 has detected movement of the registered card, the communication controller 76 reads information from the registered card, for instance, via Wi-Fi (step 810).

Also, when it is determined that a payment method is set for the print reservation file focused in step 803, the communication controller 76 reads information from the registered card, for instance, via Wi-Fi (step 811).

Consequently, the payment processor 77 generates payment information used for processing in an external payment system, based on the information read in step 808 or the information read in step 811 (step 812). However, when an unregistered card is an electronic money card, instead of generating payment information, processing to rewrite information on the balance recorded on the unregistered card may be performed.

Subsequently, the payment processor 77 refers to the registration information, and determines whether or not any other print reservation file is present (step 813). When it is determined that any other print reservation file is present, the payment processor 77 adds "1" to the counter i (step 814), and returns the processing to step 802. On the other hand, when it is determined that any other print reservation file is not present, the communication controller 76 transmits the payment information generated in step 812 to an external payment system via the communication I/F5 (step 815).

[Program]

The processing performed by the control device 70 in the exemplary embodiment is prepared, for instance, as a program such as application software.

Specifically, any program that implements the exemplary embodiment is considered to be a program that causes a computer to implement a function of reading information, and a function of, in response to an operation to move or place a medium closer to or on a display surface, displaying on the display surface guidance information that guides a position, at which information associated with the medium is readable, on the display surface.

It is to be noted that any program that implements the exemplary embodiment may be provided not only by a communication unit, but also by a recording medium such as a CD-ROM that stores the program.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
a display surface; and
a processor configured to:
read information; and
display on the display surface, in response to an operation of moving a medium closer to the display surface or placing the medium on the display surface, guidance information that guides a position, at which information associated with the medium is readable by the processor, on the display surface,
wherein the information associated with the medium is information stored in a mobile information terminal in association with the medium,
wherein the processor reads information stored in the mobile information terminal by communicating with the mobile information terminal or by taking a photograph of a display of the mobile information terminal with the information stored in the mobile information terminal displayed on the display.

2. The display apparatus according to claim 1,
wherein the processor displays the guidance information that guides the position on the display surface according to a type of the medium.

3. The display apparatus according to claim 1,
wherein the information associated with the medium is information recorded on the medium.

4. The display apparatus according to claim 3,
wherein the processor reads the information recorded on the medium by communicating with the medium.

5. The display apparatus according to claim 4,
wherein the processor displays on the display surface the guidance information that indicates the position, at which information recorded on the medium is readable by the processor, on the display surface.

6. The display apparatus according to claim 4,
wherein the processor displays on the display surface the guidance information that indicates a direction from a location to which or on which the medium is moved or placed to the position, at which the information recorded on the medium is readable by the processor, on the display surface.

7. The display apparatus according to claim 1,
wherein the processor displays on the display surface the guidance information that indicates the position, at which the information recorded on the mobile information terminal is readable by the processor, on the display surface.

8. The display apparatus according to claim 1,
wherein the processor displays on the display surface the guidance information that indicates a direction from a location to which or on which the medium is moved or placed to the position, at which the information recorded on the mobile information terminal is readable by the processor, on the display surface.

9. The display apparatus according to claim 1,
wherein the processor displays an image representing a document on the display surface, and
the information associated with the medium is information used for processing of the document represented by the image displayed by the processor at the position to which or on which the medium is moved or placed.

10. The display apparatus according to claim 9,
wherein the processor, in response to an operation to move the medium to the position, at which the information associated with the medium is readable by the processor, on the display surface, moves the image displayed on the display surface.

11. The display apparatus according to claim 10,
wherein when the processor reads the information associated with the medium, the processor changes a display mode of the image displayed on the display surface.

12. The display apparatus according to claim 9,
wherein the image includes a plurality of partial images that respectively represent a plurality of documents, and
a plurality of media, each of which is the medium, are provided, and the information associated with each medium of the plurality of media is information used for processing of at least one of the plurality of documents respectively represented by at least one of the plurality of partial images displayed by the processor at the position to which or on which the medium is moved or placed.

13. The display apparatus according to claim 9,
wherein the information used for processing of the document is information used to charge for the processing of the document.

14. A non-transitory computer readable medium storing a program causing a computer to execute a process comprising:
reading information by a processor; and
in response to an operation of moving a medium closer to a display surface or placing the medium on the display surface, displaying on the display surface guidance information that guides a position, at which information associated with the medium is readable by the processor, on the display surface, wherein the information associated with the medium is information stored in a mobile information terminal in association with the medium, wherein the processor reads information stored in the mobile information terminal by communicating with the mobile information terminal or by taking a photograph of a display of the mobile information terminal with the information stored in the mobile information terminal displayed on the display.

15. A display apparatus comprising:

reading means for reading information; and display means for, in response to an operation of moving a medium closer to a display surface or placing the medium on the display surface, displaying on the display surface guidance information that guides a position, at which information associated with the medium is readable by the reading means, on the display surface, wherein the information associated with the medium is information stored in a mobile information terminal in association with the medium, wherein the reading means reads information stored in the mobile information terminal by communicating with the mobile information terminal or by taking a photograph of a display of the mobile information terminal with the information stored in the mobile information terminal displayed on the display.

\* \* \* \* \*